US011293152B2

(12) United States Patent
Rossano et al.

(10) Patent No.: US 11,293,152 B2
(45) Date of Patent: Apr. 5, 2022

(54) ROBOTIC RESTOCKING AND SAFETY SYSTEMS FOR AUTOMATED RETAIL STORE ENVIRONMENTS

(71) Applicant: ABB Schweiz AG, Baden (CH)

(72) Inventors: Gregory F. Rossano, Enfield, CT (US);
Sangeun Choi, Simsbury, CT (US);
Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 76 days.

(21) Appl. No.: 16/378,994

(22) Filed: Apr. 9, 2019

(65) Prior Publication Data
US 2020/0327768 A1 Oct. 15, 2020

(51) Int. Cl.
| | |
|---|---|
| *E01F 13/00* | (2006.01) |
| *B25J 9/02* | (2006.01) |
| *G05D 1/02* | (2020.01) |
| *E01F 13/02* | (2006.01) |
| *B65G 1/04* | (2006.01) |
| *G05B 19/418* | (2006.01) |
| *B25J 19/06* | (2006.01) |

(Continued)

(52) U.S. Cl.
CPC ............... *E01F 13/00* (2013.01); *B25J 9/026* (2013.01); *B25J 19/06* (2013.01); *B65G 1/0492* (2013.01); *E01F 13/02* (2013.01); *G05B 19/41895* (2013.01); *G05D 1/0214* (2013.01); *B25J 9/1615* (2013.01); *B25J 9/1666* (2013.01); *G05D 1/0212* (2013.01); *G07F 11/165* (2013.01)

(58) Field of Classification Search
CPC ........ E01F 13/00; E01F 13/02; G05D 1/0214; B25J 9/02; B25J 9/026
See application file for complete search history.

(56) References Cited

U.S. PATENT DOCUMENTS

| | | | | |
|---|---|---|---|---|
| 4,138,095 A | * | 2/1979 | Humphrey | ............ E01F 15/086 |
| | | | | 256/1 |
| 4,362,433 A | * | 12/1982 | Wagner | ................... E02B 3/108 |
| | | | | 405/107 |

(Continued)

FOREIGN PATENT DOCUMENTS

| | | |
|---|---|---|
| DE | 19640527 A1 | 4/1998 |
| WO | WO 2018/106719 A1 | 6/2018 |

OTHER PUBLICATIONS

European Patent Office, International Search Report in International Patent Application No. PCT/IB2020/053168, 7 pp. (dated Sep. 7, 2020).

(Continued)

*Primary Examiner* — Thomas Randazzo
(74) *Attorney, Agent, or Firm* — Leydig, Voit & Mayer, Ltd.

(57) ABSTRACT

Systems, methods, and software are provided for automated item restocking using gantry robots and establishing safety barriers for retail work operation spaces in retail store environments. Robot controllers in communication with the gantry robots and barrier robots direct the autonomous movements thereof for transferring items between customer-accessible point of sale locations and customer-inaccessible storage, and for alternately restricting and enabling access to work operation spaces, respectively.

14 Claims, 16 Drawing Sheets

(51) Int. Cl.
*B25J 9/16* (2006.01)
*G07F 11/16* (2006.01)

(56) References Cited

U.S. PATENT DOCUMENTS

| | | | |
|---|---|---|---|
| 5,934,864 A | 8/1999 | Lyon et al. | |
| 6,505,093 B1 | 1/2003 | Thatcher et al. | |
| 7,428,957 B2 | 9/2008 | Schaefer | |
| 7,896,243 B2* | 3/2011 | Herskovitz | G06Q 20/18 235/383 |
| 8,276,739 B2 | 10/2012 | Bastian, II et al. | |
| 9,120,622 B1* | 9/2015 | Elazary | B25J 15/0608 |
| 9,702,887 B2 | 7/2017 | Neeper et al. | |
| 9,727,701 B2 | 8/2017 | Holmes et al. | |
| 10,163,290 B1* | 12/2018 | Burroughs | G07C 9/215 |
| 2003/0197165 A1* | 10/2003 | Perelli | E01F 13/02 256/26 |
| 2006/0076544 A1* | 4/2006 | Kurple | E01F 9/688 256/26 |
| 2007/0170411 A1* | 7/2007 | Ribak | E04H 17/18 256/32 |
| 2009/0185884 A1* | 7/2009 | Wurman | B65G 1/1373 414/270 |
| 2012/0060539 A1 | 3/2012 | Hunt et al. | |
| 2013/0302132 A1* | 11/2013 | D'Andrea | G06Q 50/28 414/807 |
| 2014/0100769 A1* | 4/2014 | Wurman | B65G 1/10 701/301 |
| 2014/0361077 A1 | 12/2014 | Davidson | |
| 2015/0325058 A1* | 11/2015 | Lambrinos | G07B 15/04 705/13 |
| 2016/0196706 A1* | 7/2016 | Tehranchi | G07C 9/00174 340/5.61 |
| 2016/0229631 A1* | 8/2016 | Kimura | B65G 1/10 |
| 2016/0236867 A1 | 8/2016 | Brazeau et al. | |
| 2017/0038004 A1* | 2/2017 | Kalinski | F16P 1/02 |
| 2018/0174394 A1 | 6/2018 | Chirnomas | |
| 2018/0341908 A1 | 11/2018 | Lert, Jr. et al. | |
| 2019/0019408 A1* | 1/2019 | Beaulieu | G08G 1/0955 |
| 2019/0057561 A1* | 2/2019 | Zavesky | G16H 40/67 |
| 2019/0118370 A1* | 4/2019 | Rennuit | B05D 1/40 |
| 2019/0235511 A1* | 8/2019 | Tiwari | G06Q 10/087 |
| 2020/0050206 A1* | 2/2020 | Deyle | G01S 13/74 |
| 2020/0156253 A1* | 5/2020 | Li | B25J 9/1617 |
| 2020/0233419 A1* | 7/2020 | McDuff | G08G 1/205 |
| 2021/0002834 A1* | 1/2021 | Putnam | E04B 2/7407 |

OTHER PUBLICATIONS

European Patent Office, Written Opinion in International Patent Application No. PCT/IB2020/053168, 10 pp. (dated Sep. 7, 2020).
Cimcorp, "Cimcorp Goods-to-Man—Up to six times more efficient than a manual solution," webpage downloaded from the Internet at https://www.cimcorp.com/en/logistics-automation/products-and-solutions/goods-person, 2 pp.
Refills, "Robotics Enabling Fully-Integrated Logistics Lines for Supermarkets—Refills (Project ID: 731590)," webpage downloaded from the Internet on Sep. 20, 2018, at http://ww.refills-project.eu/, 4 pp/.

* cited by examiner

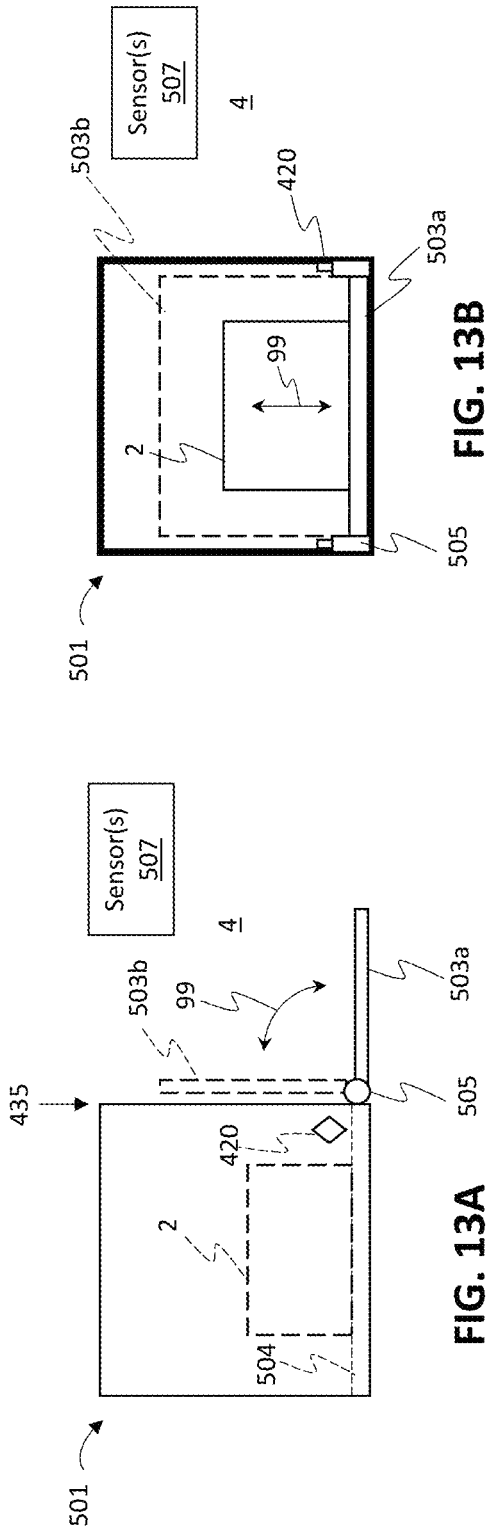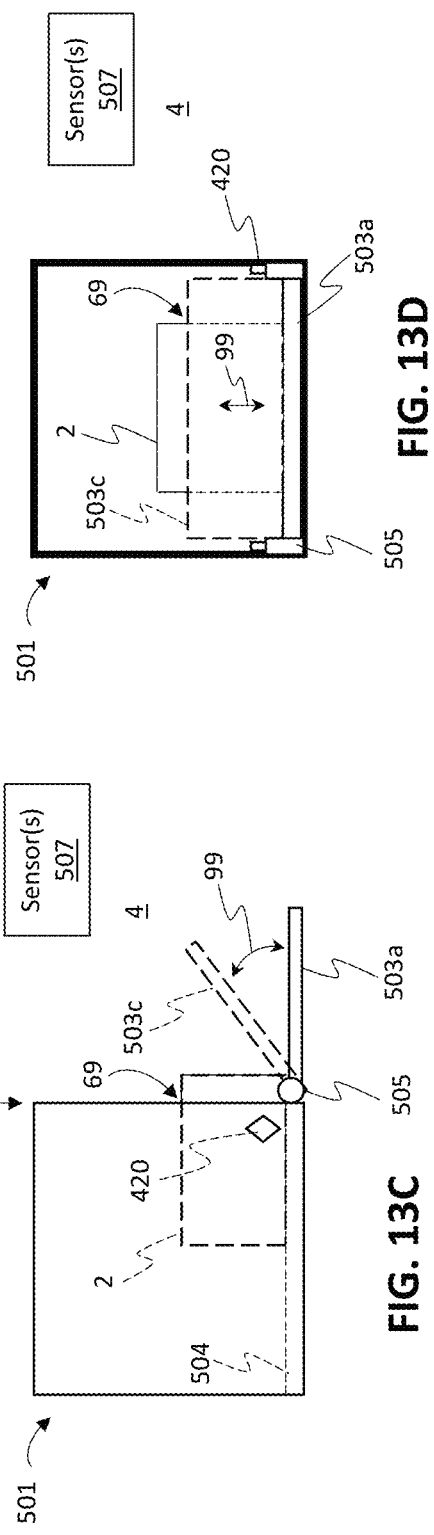

ROBOTIC RESTOCKING AND SAFETY SYSTEMS FOR AUTOMATED RETAIL STORE ENVIRONMENTS

TECHNICAL FIELD

The present disclosure relates to automated retail store operations, and, more particularly, to robotic restocking and safety systems for automated retail store environments.

BACKGROUND

Warehouse style stores typically store products for future use in storage locations above aisles and out of reach of customers. In at least some such retail environments, store workers manually transfer items in the customer-inaccessible storage locations on as-needed basis, such as in response to being alerted by customers of items being out of stock. Various types of equipment may be used by operators of warehouse style stores to assist workers with storing and retrieving items from the customer-inaccessible storage locations above aisles, but such tasks may still present safety and inefficiency concerns for operators.

Known systems and devices utilized in warehouse style stores may require disparate information sources for effective use and they may inhibit, rather than enhance, the customer experience. To more fully realize the economic benefits of in-store retail automation, a need exists for systems, methods, and software providing robotic mechanisms that integrate a variety of relevant data sources in a safe, reliable and efficient manner for store operators and their customers.

SUMMARY

The systems, methods, and software disclosed herein provide users a number of beneficial technical effects and realize various advantages as compared to known robotic restocking and operational safety systems and methods. As used in retail store environments for automated restocking of items and related retail work operational scenarios, the embodiments disclosed herein provide robotic devices, systems, and control mechanisms that integrate a variety of relevant data sources in a safe, reliable and efficient manner for store operators and their customers.

In one aspect, the disclosure describes a system for automated restocking of items in a retail store environment having customer-accessible point-of-sale (POS) locations for the items and customer-inaccessible storage for the items. The system includes a mounting platform, and a gantry robot operably coupled to the mounting platform. The system includes a robot controller in communication with the gantry robot for directing autonomous movements of the gantry robot to facilitate transferring, by the gantry robot, the items from the customer-inaccessible storage to the customer-accessible POS locations in response to determining a quantity of the items in the customer-accessible POS locations decreasing below a user-predetermined value. The system includes one or more sensors in communication with the robot controller.

In another aspect, the disclosure describes a system for restricting access to a space in a retail store environment before or during retail work operations in the space. The system includes a mobile barrier robot positioned on a floor of the retail store environment. The system includes a robot controller in communication with the barrier robot for directing autonomous movements of the barrier robot to facilitate positioning the barrier robot on the floor proximal the space to at least partially enclose the space before or during the retail work operations therein. The system includes one or more robot sensors operably coupled to the barrier robot and in communication with the robot controller.

In yet another aspect, the disclosure describes a system for securing items in a retail store environment having customer-accessible POS locations for the items and customer-inaccessible storage including a storage location for storing one or more of the items. The system includes a barrier device operably coupled to at least a portion of the storage location for alternately enabling and restricting access to the storage location. The system includes a barrier actuator operably coupled to: the barrier device, and the at least a portion of the storage location. The system includes a barrier controller in communication with the barrier actuator for directing autonomous movements of the barrier device to facilitate alternately opening and closing the barrier device. The system includes one or more sensors in communication with the barrier controller. Alternately opening and closing the barrier device facilitates alternately enabling and restricting the access to the storage location.

The robotic restocking and safety systems for automated retail store environments disclosed herein provide users a number of beneficial technical effects and realize various advantages as compared to known robotic restocking and operational safety systems and methods. Such benefits include, without limitation, being more efficient in use of storage space, physical infrastructure, and computing resources, network bandwidth, and memory storage capacity, providing less expensive and more user friendly installation, operation, and maintenance, consuming less power, being safer and less intrusive to users, shoppers, and employees in retail store and other use environments, allowing use with a number of different items, packaging configurations, delivery modalities, and POS configurations, being interoperable with various extant store equipment, and having the ability to utilize a number of data communication protocols.

Further and alternative aspects and features of the disclosed principles will be appreciated from the following detailed description and the accompanying drawings. As will be appreciated, the principles related to the disclosed robotic restocking and safety systems for automated retail store environments are capable of being carried out in other and different embodiments, and capable of being modified in various respects. Accordingly, it is to be understood that the foregoing summary, the following detailed description, and the appended drawings are exemplary and explanatory only and do not restrict the scope of the appended claims.

BRIEF DESCRIPTION OF THE DRAWINGS

FIGS. 13A-13D are schematic diagrams of the system shown in FIG. 12 illustrating an obstruction to an open-to-closed position movement path of a barrier device according to an embodiment of the disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1A:
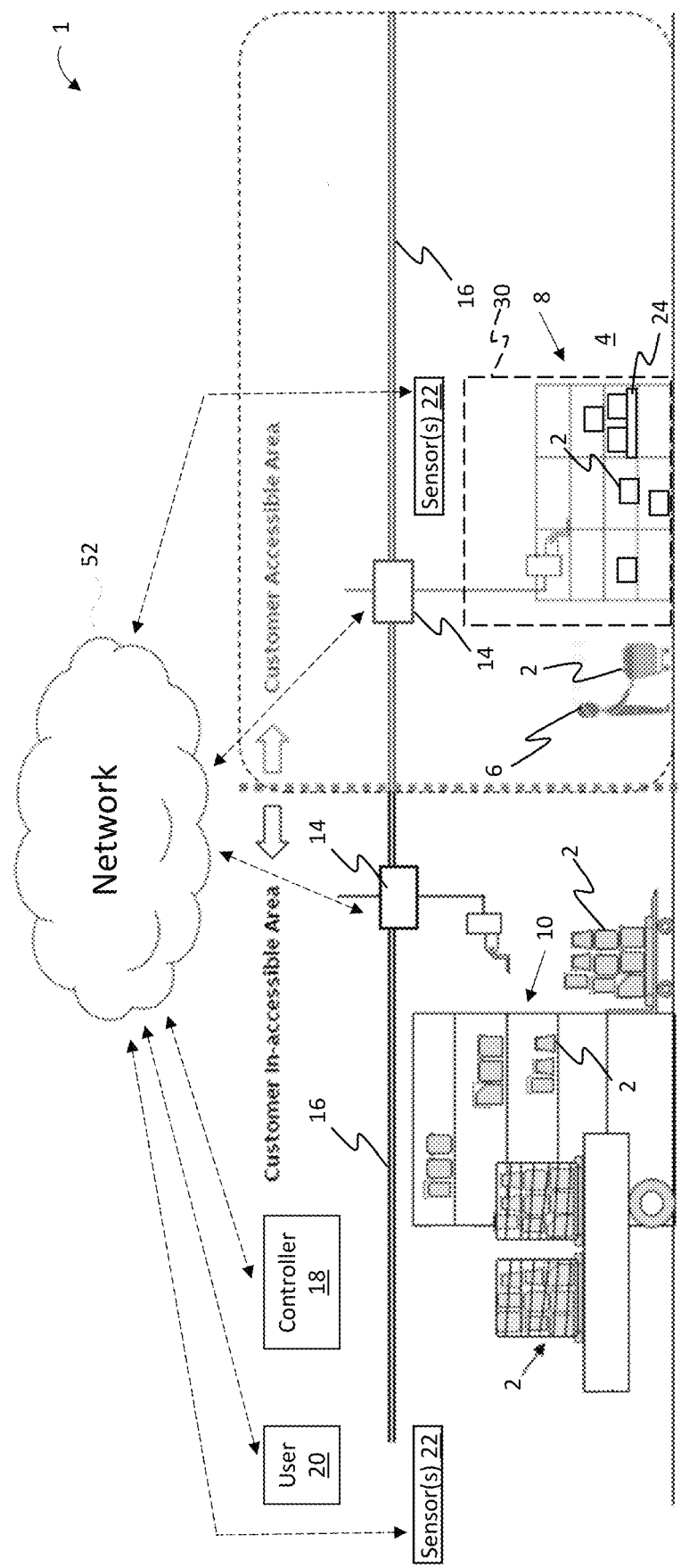
FIG. 1A is a schematic diagram of a system for automated restocking of items in a retail store environment having customer-accessible point-of-sale (POS) locations for the items and customer-inaccessible storage for the items according to an embodiment of the disclosure.
Figure 1B:
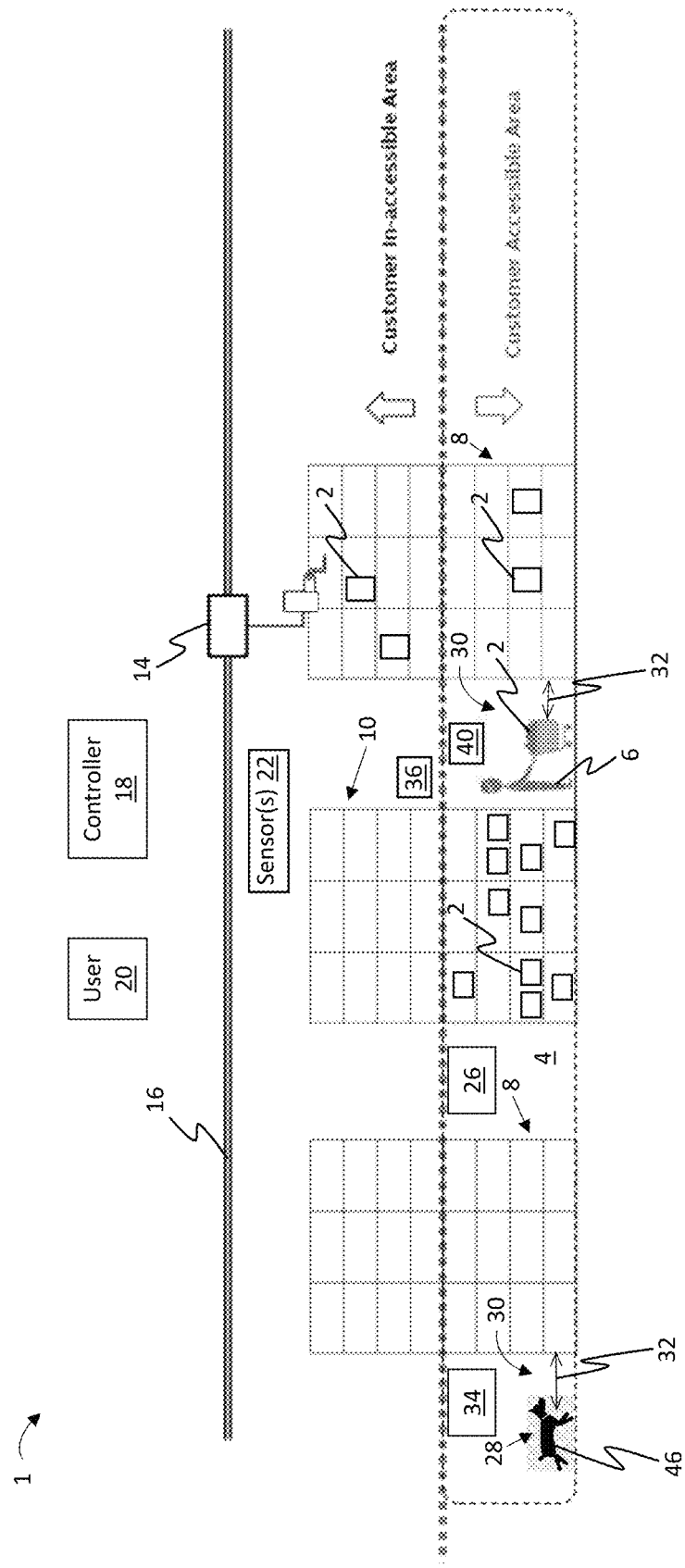
FIG. 1B is a schematic diagram of the system shown in FIG. 1A illustrating vertically separated customer-accessible POS locations and customer-inaccessible storage according to an embodiment of the disclosure.
Figure 1C:
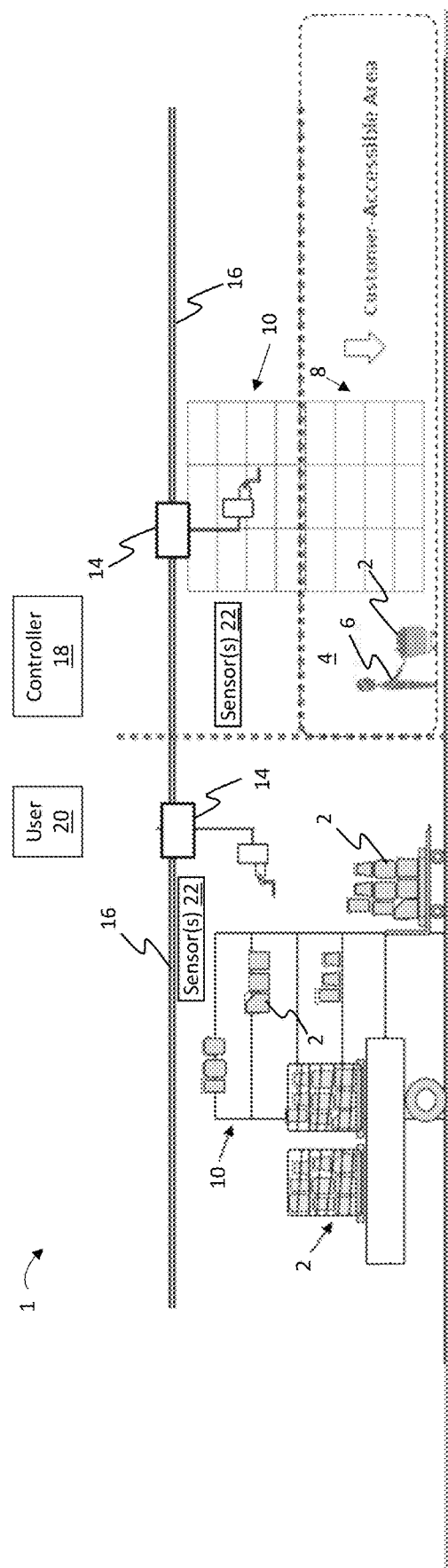
FIG. 1C is a schematic diagram of the system shown in FIG. 1A illustrating customer-accessible POS locations and customer-inaccessible storage both horizontally and vertically separated according to an embodiment of the disclosure.
Figure 2:
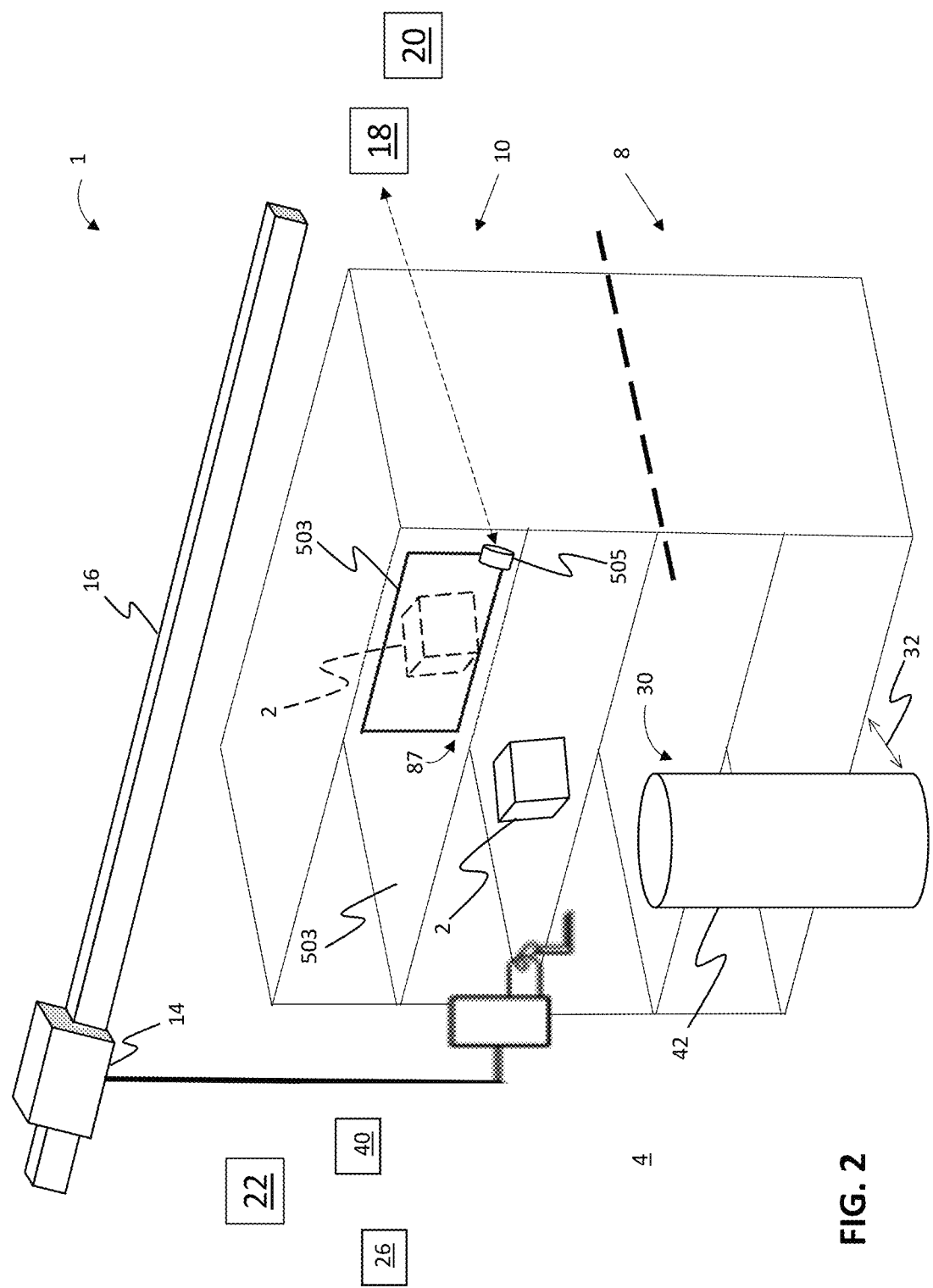
FIG. 2 is a schematic diagram of the system shown in FIGS. 1A-1C illustrating an obstruction proximal the customer-accessible POS locations according to an embodiment of the disclosure.
Figure 3:
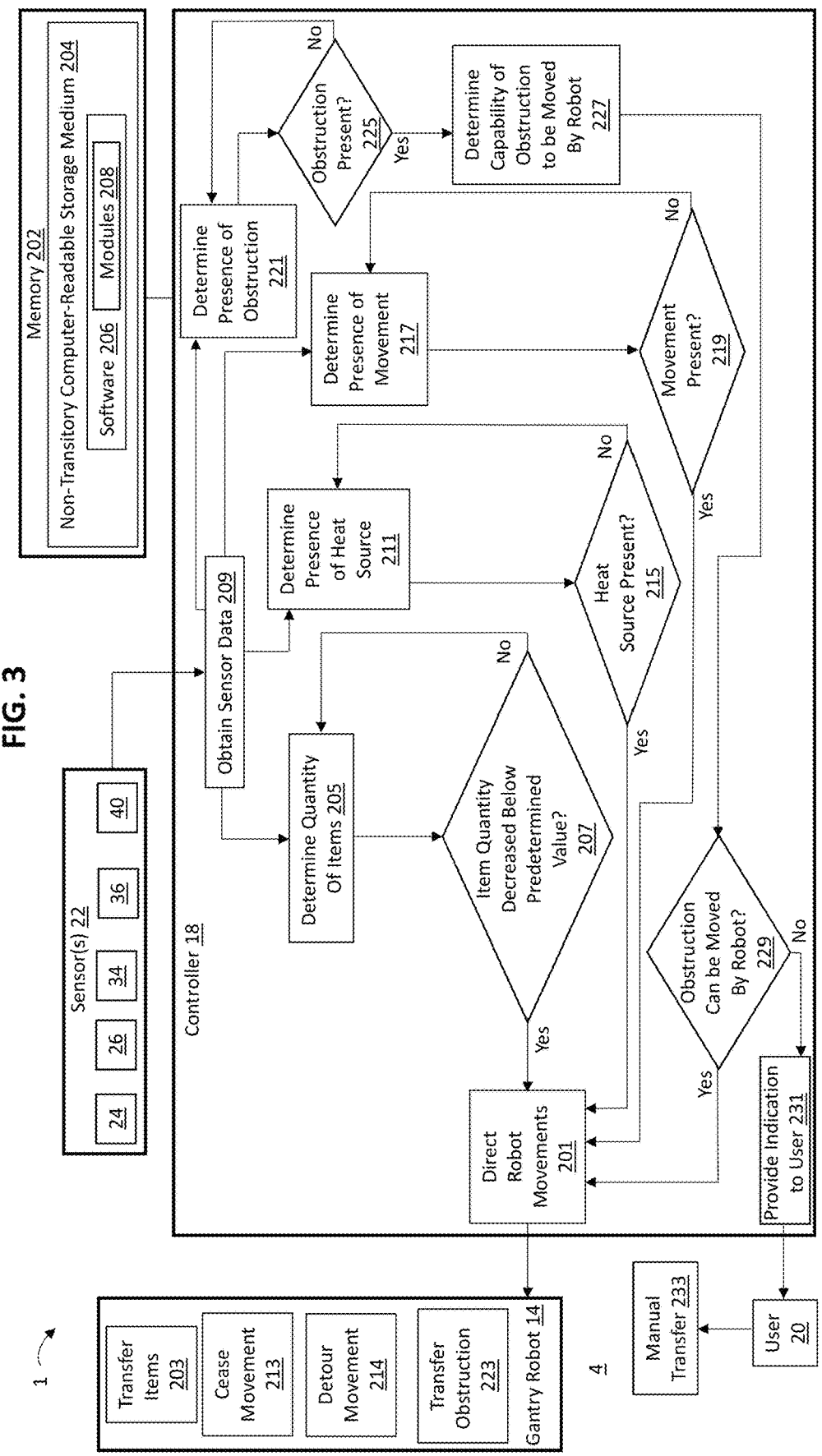
FIG. 3 is a flow chart illustrating aspects of operation of the system shown in FIGS. 1-2 according to embodiments of the disclosure.

FIG. 1A is a schematic diagram of a system (1) for automated restocking of items (2) in a retail store environment (4) having customer (6)-accessible point-of-sale (POS) locations (8) for the items (2) and customer (6)-inaccessible storage (10) for the items (2) according to an embodiment of the disclosure. FIG. 1B is a schematic diagram of the system (1) shown in FIG. 1A illustrating vertically separated customer (6)-accessible POS locations (8) and customer (6)-inaccessible storage (10) according to an embodiment of the disclosure. FIG. 1C is a schematic diagram of the system (1) shown in FIG. 1A illustrating customer (6)-accessible POS locations (8) and customer (6)-inaccessible storage (10) both horizontally and vertically separated according to an embodiment of the disclosure. FIG. 2 is a schematic diagram of the system (1) shown in FIGS. 1A-1C illustrating an obstruction (42) proximal the customer (6)-accessible POS locations (8). FIG. 3 is a flow chart illustrating aspects of operation of the system (1) shown in FIGS. 1-2 according to embodiments of the disclosure.

Referring to FIGS. 1-3, the system (1) includes at least one mounting platform (12), and at least one gantry robot (14) operably coupled to the mounting platform (16). The system includes at least one robot controller (18) in communication with the gantry robot (14). In an example, robot controller(s) (18) are also in communication with at least one user (20) of system (1). The system (1) includes at least one sensor (22) in communication with robot controller(s) (18). In an example, sensor(s) (22) are positioned in or operably coupled to gantry robot(s) (14). In another example, sensor(s) (22) are positioned in or near, and/or are operably coupled to customer (6)-accessible POS location(s) (8) and/or customer-inaccessible storage (10) locations. System (1) includes one or more memory devices (202) in communication with robot controller(s) (18).

Robot controller(s) (18) may be located in retail environment (4). Robot controller(s) (18) may be located remote from retail environment (4). Robot controller(s) (18) may be collocated with gantry robot(s) (14). Robot controller(s) (18) are programmed to implement and/or otherwise perform, at least in part, one or more of the disclosed steps, operations, and/or processes of system (1), including, without limitation, those shown and described with reference to FIGS. 1-3. Robot controller(s) (18) are capable of carrying out multiple functions in system (1). Robot controller(s) (18) include robotic movement control functionality, data processing, and data communication functionality, which may be implemented, at least in part, using one or more processors and/or other suitable computing devices and subsystems (not shown in FIGS. 1-3).

In an example, memory device(s) (202) include a non-transient computer-readable medium (204). Non-transient computer-readable medium (204) stores as software (206) computer-executable instructions for automated restocking of items (2) in the retail store environment (4) having customer (6)-accessible point-of-sale (POS) locations (8) for the items (2) and customer (6)-inaccessible storage (10) for the items (2). In an example, computer-executable instructions stored as software (206) includes one or more software modules (208). When executed by the robot controller(s) (18) that are in communication with memory device(s) (202), gantry robot(s) (14), sensor(s) (22), and/or user(s) (20), the computer-executable instructions cause the robot controller(s) (18) to implement and/or otherwise perform, at least in part, one or more of the disclosed operations, steps, and/or processes of system (1).

In system (1), robot controller(s) (18), memory device(s) (202), gantry robot(s) (14), and/or user(s) (20) are in communication with one another via, and communicate with one another using signals (e.g., encoded data signals) sent and/or received through, a network (52). Communication among and between robot controller(s) (18), sensor(s) (22), memory device(s) (202), gantry robot(s) (14), and/or user(s) (20) is facilitated by transceivers (not shown in FIGS. 1-3). In an example, system (1) communication using network (52) includes wireless communication equipment and protocols. In another example, system (1) communication using network (52) includes wired communication equipment and protocols. In yet another example, system (1) communication using network (52) includes a combination of wireless and wired communication equipment and protocols. In an example, system (1) communication includes wireless and/or wired communication equipment and protocols for utilizing cloud-based processing, storage, and/or communication resources. In an example, system (1) communication utilizes the Internet, including, without limitation, Internet of Things (IoT) protocols, practices, and/or standards.

In operation of system (1), the at least one robot controller (18) directs (201) autonomous movements of the gantry robot(s) (14) to facilitate transferring (203), by the gantry robot (14), the items (2) from the customer (6)-inaccessible storage (10) to the customer (6)-accessible POS locations (8). In an example, one or more items (2) are transferred (203) by gantry robot(s) (14) in response to determining (205) (e.g., by robot controller(s) (18)) a quantity of the items (2) in the customer (6)-accessible POS locations (8) decreasing below a user (20)-predetermined value.

In the example, robot controller(s) (18) direct (201) the autonomous movements of gantry robot(s) (14) to transfer (203) the item(s) (2) from storage (10) to POS location(s) (8) upon determining (205), using logic branch (207), that the quantity or quantities of particular item(s) (2) have fallen below a customer-accessible inventory level in the POS location(s) (8). Otherwise, upon robot controller(s) (18) determining (205) that the quantity or quantities of particular item(s) (2) have not decreased below the user (20)-predetermined value, logic branch (207) operates in system (1) to return the robot controller(s) (18) back to the determining (205) step. The user (20)-predetermined value may be stored in memory (202) for use by the robot controller(s) (18) for this determining (205) step. In embodiments for which the directing (201), transferring (203), and/or determining (205) step(s) is/are implemented and/or otherwise performed in system (1) by software (206), robot controller(s) (18) execute computer-executable instructions stored in directing, transferring, and/or quantity determining obtaining module(s) (208), respectively. In this manner, robot controller(s) (18) continually monitor the inventory level(s) of item(s) (2) present in the customer (6)-accessible POS locations (8) and may take immediate action to replenish the inventory of item(s) (2) therein on as needed basis.

In an example, the user (20) predetermined value is set by user (20) based on a desired constant quantity of particular item(s) (2) in respective POS location(s) (8) in the retail store environment (4). In another example, the user (20) predetermined value is set by user (20) based on a rate at which particular item(s) (2) are being sold to customers (6) from the POS location(s) (8). User(s) (20) may periodically update the predetermined values for respective item(s) (2) in the memory device(s) (202). These data for user (20) predetermined values for item (2) quantities may be further set based on item (2) sales, volume, demand, and/or inventory data for the retail store environment (4), which may be beneficially utilized by user(s) (20) of system (1) to maximize the probability that item(s) (2) desired to be bought by customers (6) are readily available in the respective POS location(s) (8) for those item(s) (2).

In an embodiment, the one or more sensors (22) of system (1) facilitate the robot controller(s) (18) obtaining (209) data representative of the quantity of items (2) in the customer (6)-accessible POS locations (8). In the embodiment, the robot controller(s) (18) direct (201) the autonomous movements of the gantry robot(s) (14) to further facilitate transferring (203) the items (2) from the customer (6)-inaccessible storage (10) to the customer (6)-accessible POS locations (8) in response to the data obtained from the one or more sensors (22), and based on the operational outcome of logic branch (207). In embodiments for which the obtaining (209) step is implemented and/or otherwise performed in system (1) by software (206), robot controller(s) (18) execute computer-executable instructions stored in an obtaining module (208).

In an example, sensor(s) (22) include at least one weight sensor (24) positioned underneath the items (2) in the customer (6)-accessible POS locations (8), as shown in FIGS. 1-2. Weight sensor(s) sense a weight of the items (2) in the customer (6)-accessible POS locations (8). In the example, the data representative of the quantity of items (2) include a value of the sensed weight of the items (2) in the customer (6)-accessible POS locations (8). So, for instance, robot controller(s) (18) may determine (205) current inventory of like-items (2) in the customer (6)-accessible POS locations (8) having weight sensors (24) by dividing the obtained (209) sensed weight by the per unit weight (e.g., stored in memory (202)) of individual items (2) therein. In embodiments for which this dividing operation is implemented and/or otherwise performed in system (1) by software (206), robot controller(s) (18) execute computer-executable instructions stored in a dividing module (208).

In an example, the one or more sensors (22) include at least one computer vision device (26), either instead of, or in addition to, weight sensor(s) (24). In the example, computer vision device(s) (26) are positioned in view of the customer (6)-accessible POS locations (8) for imaging the items (2) therein, as shown in FIGS. 1-2. In the example, the data representative of the quantity of items (2) includes an image of the items (2) in the customer (6)-accessible POS locations (8). So, for instance, robot controller(s) (18) may determine (205) current inventory of like and/or dissimilar items (2) in the customer (6)-accessible POS locations (8) having computer vision device(s) (26) by analyzing the obtained (209) images thereof (e.g., using image recognition algorithms, including without limitation, incorporating machine learning and/or artificial intelligence schemes). In embodiments for which this image analysis operation is implemented and/or otherwise performed in system (1) by software (206), robot controller(s) (18) execute computer-executable instructions stored in an image analysis module (208).

In an embodiment, the obstruction (42) is or includes a heat source (28). In an example, the one or more sensors (22) of system (1) facilitate the robot controller(s) (18) obtaining (209) data representative of a presence of the heat source (28) within a space (30) at least partly defining a predetermined distance (32) from the customer (6)-accessible POS locations (8), as shown in FIG. 1B. In an example, the robot controller(s) (18) further facilitate determining (211) the presence of the heat source (28) within the space (30) based on the data obtained from the one or more sensors (22). The robot controller(s) (18) direct (201) the autonomous movements of the gantry robot (14) to at least one of: cease (213), and detour (214), in response to determining (211) the presence of the heat source (28) within the space (30).

In the example, robot controller(s) (18) direct (201) the autonomous movements of gantry robot(s) (14) to cease (213) and/or detour (214) upon determining (211), using logic branch (215), that the heat source (28) is present within (or proximal to) the space (30). Otherwise, upon robot controller(s) (18) determining (211) that heat source (28) is not present within (or proximal to) the space (30), logic branch (215) operates in system (1) to return the robot controller(s) (18) back to the determining (211) step. In embodiments for which the determining (211), ceasing (213), and/or detouring (214) step(s) is/are implemented and/or otherwise performed in system (1) by software (206), robot controller(s) (18) execute computer-executable instructions stored in heat source determining, ceasing, and/or detouring module(s) (208), respectively. In this manner, robot controller(s) (18) continually monitor the space (30) and/or regions proximal thereto for heat sources which may indicate customer (6) (or their pets, if applicable) presence therein and may take immediate action to cease (213) and/or detour (214) movements of gantry robot(s) (14) on an as needed basis to ensure safety and comfort in the retail store environment (4).

In an example, the one or more sensors (22) include a thermal sensor (34) positioned in view of the space (30) for sensing a presence of a warm-blooded animal (46) (e.g., as the heat source (28)) within (or proximal to) the space (30). In the example, the robot controller(s) (18) further facilitate determining (211) the presence of the heat source (28) as the presence of the warm-blooded animal (46) within the space (30) based on the data obtained from the thermal sensor (34). In embodiments for which this aspect of the determining (211) step is implemented and/or otherwise performed in system (1) by software (206), robot controller(s) (18) execute computer-executable instructions stored in a warm-blooded animal presence determining module.

In an embodiment, the obstruction (42) is or includes a moving object (e.g., animal (46)). In an example, the one or more sensors (22) of system (1) facilitate the robot controller(s) (18) obtaining (209) data representative of a presence of movement within the space (30) at least partly defining the predetermined distance (32) from the customer (6)-accessible POS locations (8), as shown in FIG. 1B. In an example, the robot controller(s) (18) further facilitate determining (217) the presence of movement within the space (30) based on the data obtained (209) from the one or more sensors (22). The robot controller(s) (18) direct (201) the autonomous movements of the gantry robot (14) to at least one of: cease (213), and detour (214), in response to determining (211) the presence of movement within the space (30).

In the example, robot controller(s) (18) direct (201) the autonomous movements of gantry robot(s) (14) to cease (213) and/or detour (214) upon determining (217), using logic branch (219), the presence of movement within (or proximal to) the space (30). Otherwise, upon robot controller(s) (18) determining (217) that no movement is present within (or proximal to) the space (30), logic branch (219) operates in system (1) to return the robot controller(s) (18) back to the determining (217) step. In an example, the one or more sensors (22) include at least one of: a motion sensor (36), a computer vision device (26), and a three-dimensional (3D) scanner (40). These sensor(s) (36, 26, and/or 40) are positioned in view of the space (30) for sensing the presence of movement within the space (30). In the example, the robot controller(s) (18) further facilitate determining (217) the presence of movement within the space (30) based on the data obtained from the motion sensor (36), computer vision device (26), and/or 3D scanner (40). In embodiments for which the determining (217), ceasing (213), and/or detouring (214) step(s) is/are implemented and/or otherwise performed in system (1) by software (206), robot controller(s) (18) execute computer-executable instructions stored in movement determining, ceasing, and/or detouring module(s) (208), respectively. In this manner, robot controller(s) (18) continually monitor the space (30) and/or regions proximal thereto for presence of movement which may indicate customer (6) (or their pets, if applicable) presence therein and may take immediate action to cease (213) and/or detour (214) movements of gantry robot(s) (14) on an as needed basis to ensure customer (6) safety and comfort in the retail store environment (4).

In an embodiment, the one or more sensors (22) facilitate the robot controller (18) obtaining (209) data representative of a presence of an actual or potential obstruction (42) to the autonomous movements of the gantry robot (14) within the space (30) at least partly defining the predetermined distance (32) from the customer (6)-accessible POS locations (8), as shown in FIG. 2. In an example, the robot controller(s) (18) further facilitate determining (221) the presence of the obstruction (42) within the space (30) based on the data obtained from the one or more sensors (22). The robot controller(s) (18) direct (201) the autonomous movements of the gantry robot(s) (14) to transfer (223) the obstruction (42) out of the space (30) in response to determining (221) the presence of the obstruction (42) within the space (30).

In an example, robot controller(s) (18) direct (201) the autonomous movements of the gantry robot(s) (14) to transfer (223) the obstruction (42) out of the space (30) upon determining (221), using logic branch (225), the presence of the obstruction (42) within (or proximal to) the space (30). Otherwise, upon robot controller(s) (18) determining (221) that no obstruction (42) is present within (or proximal to) the space (30), logic branch (225) operates in system (1) to return the robot controller(s) (18) back to the determining (221) step. In embodiments for which the determining (221) and/or transferring (223) step(s) is/are implemented and/or otherwise performed in system (1) by software (206), robot controller(s) (18) execute computer-executable instructions stored in obstruction determining and/or transferring module(s) (208), respectively. In this manner, robot controller(s) (18) continually monitor the space (30) and/or regions proximal thereto for presence of actual or potential obstructions (42) which may impede or otherwise undesirably impact movements of gantry robot(s) (14) and takes responsive action on an as needed basis to ensure continuous, safe, and efficient gantry robot (14) operations in the retail store environment (4).

In an embodiment, the obstruction (42) is or includes a stationary object. In an example, the one or more sensors (22) include at least one of: the motion sensor (36), the computer vision device (26), and the 3D scanner (40). These sensor(s) (36, 26, and/or 40) are positioned in view of the space (30) for sensing the presence of obstruction(s) (42) (e.g., stationary and/or moving objects) within the space (30). In the example, the robot controller(s) (18) further facilitate determining (221) the presence of obstruction(s) (42) within the space (30) based on the data obtained from the motion sensor (36), computer vision device (26), and/or 3D scanner (40).

In an example, the robot controller (18) further facilitates determining (227) a capability of the obstruction (42) to be moved (e.g., transferred (223) out of the space (30) by the gantry robot(s) (14) based on the data representative of the presence of the obstruction (42). In the example, the process of robot controller(s) (18) determining (227) the capability of the obstruction (42) to be moved out of the space (30) by the gantry robot(s) (14) utilizes logic branch (229). If the obstruction (42) is determined (227) by robot controller(s) (18) to be so movable by gantry robot(s) (14), robot controller(s) (18) direct (201) the autonomous movements of the gantry robot (14) to transfer (223) the obstruction (42) out of the space (30). Otherwise, upon robot controller(s) (18) determining (227) that obstruction (42) cannot be so moved out of space (30) by gantry robot(s) (14), the robot controller (18) further facilitates providing (231) an indication (e.g., lights, sounds, and/or messages) to user(s) (20) of the system (1) of a need to manually transfer (233) the obstruction (42) out of the space (30). In embodiments for which the determining (227) and/or providing (231) step(s) is/are implemented and/or otherwise performed in system (1) by software (206), robot controller(s) (18) execute computer-executable instructions stored in transfer capability determining and/or providing module(s) (208), respectively. In this manner, robot controller(s) (18) implement responsive actions and/or provide notifications to user(s) (20) regarding obstructions (42) in space (30) and/or regions proximal thereto to ensure continuous, safe, and efficient gantry robot (14) operations in the retail store environment (4). In an example, the robot controller(s) (18) further facilitate directing (201) the autonomous movements of the gantry robot(s) (14) away from the space (30) during or after the movements thereof within or proximal the space (30).

Figure 4:
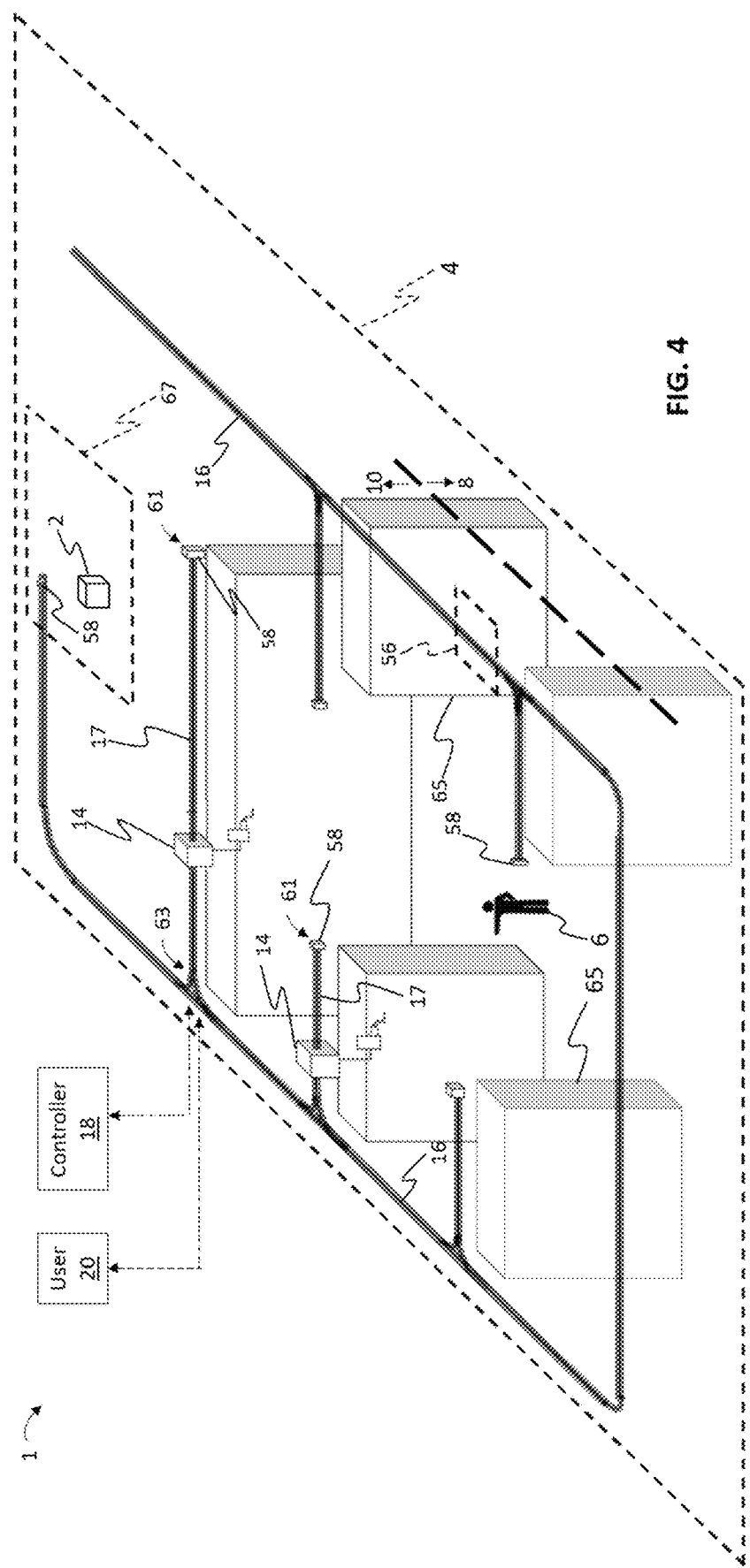
FIG. 4 is a schematic diagram of a branched gantry robot mounting platform which may be used in the system shown in FIGS. 1-3 according to an embodiment of the disclosure.

FIG. 4 is a schematic diagram of a branched gantry robot (14) mounting platform (16) which may be used in the system shown in FIGS. 1-3 according to an embodiment of the disclosure. In the embodiment, mounting platform (16) includes one or more branch tracks (17) for one or more gantry robots (14) utilized in system (1). Each of the branch track(s) (17) includes a safety stop (58). Each safety stop (58) is positioned at a terminus end (61) of each branch track (17) for preventing movement of the gantry robot(s) (14) beyond a point defined by the safety stop (58).

The branched mounting platform (16) includes branch switches (63) positioned at intersections between branch tracks (17) and the main mounting platform (16) track (56). In an example, branch switch(es) (63) are in communication with robot controller(s) (18) to facilitate receipt and transmission, respectively, of control signals for changing gantry robot (14) movement path direction to/from branch track(s) (17) and the main mounting platform (16) track (56). In another example, and instead of or in addition to being in communication with robot controller(s) (18), branch switch(es) (63) are in communication with system (1) user(s) (20) for receipt and transmission, respectively, of control signals for changing gantry robot (14) movement path direction to/from branch track(s) (17) and the main mounting platform (16) track (56).

In an example, system (1) includes a plurality of gantry robots (14) and a plurality of branch tracks (17). As shown in FIG. 4, one of the plurality of gantry robots (14) is operably coupled to a first of the plurality of branch tracks (17), and at least a second of the plurality of gantry robots (14) is operably coupled to at least a second of the plurality of branch tracks (17). Even for just one gantry robot (14) utilized by user(s) (20) in system (1), the mounting platform (16) configuration shown in FIG. 4 advantageously enables gantry robots( ) (14) to move about and service the entire retail store environment (4) in an efficient and safe manner, rather than having to provide one gantry robot (14) for each shelving unit (65).

In an embodiment, retail store environment (4) includes a staging area (67) for items (2). Items (2) received from stockrooms or elsewhere may thus be stored in an intermediate location for ready and convenient pickup by gantry robot(s) (14) as needed to supply POS locations (8) and/or storage (10) in retail store environment (4) using system (1) (e.g., based on anticipated customer (6) demand for the items (2) in the store). Instead of, or in addition to, area (67) being used for staging items (2), area (67) can also be used for intermediate storage of empty boxes and/or other packaging waste for items (2) moved by gantry robot(s) (14) to area (67) from elsewhere in retail store environment (4) for later disposal.

Referring to FIG. 2, in an embodiment, the customer (6)-inaccessible storage (10) for the items (2) includes one or more storage locations (504) for storing at least one of the items (2). Storage location(s) (504) include, for example and without limitation, shelves, covers, compartments, cages, lofts, hangers, bins, and drawers. As used herein, storage location(s) (504) may also include supportive structures such as framing for the customer (6)-inaccessible storage (10) and/or for the storage location(s) (504) themselves. In the embodiment, the system (1) further includes a barrier device (503) for alternately enabling and restricting access to the storage location (504) (and the item(s) (2) stored therein). In an example, the barrier device (503) is a passive device that is operably coupled to at least a portion of the storage location (504) as, for example, by way of one or more hinges (87). In the example, the passive barrier device (503) may include a locking and/or other mechanism for securing the barrier device (503) in a closed position for restricting access to the storage location (504). In the example, the gantry robot(s) (14) include robot arms and/or grippers (not shown in FIG. 2) configured to manipulate the passive barrier device (503) for purposes of alternately opening and closing the passive barrier device (503), including, without limitation, by operating the locking and/or other mechanism for securing the barrier device (503) in the closed position.

In another example, the system (1) of this embodiment includes a barrier actuator (505) in communication with the robot controller (18). The barrier actuator (505) is operably coupled to: the barrier device (503), and at least a portion of the storage location (504). In the example, the barrier actuator (505) is or includes a controllable bi-directional electric motor facilitating rotation of barrier device (503) about hinge(s) (87) coupled to and between at least a portion of storage location (504) and barrier device (503). In an example, the robot controller (18) further facilitates directing, using the barrier actuator (505), autonomous movements of the barrier device (503) to alternately open and close the barrier device (503). In another example, the robot controller (18) further facilitates directing (201) the autonomous movements of the gantry robot(s) (14) to alternately open and close the barrier device (503). The barrier actuator (505) may be manually operable by user(s) (20), including, for example and without limitation, by way of a switch (not shown in FIG. 2) to control flow and/or directionality of electric current to barrier actuator (505). Alternately opening and closing the barrier device (503) facilitates alternately enabling and restricting the access the storage location (504).

Figure 5:
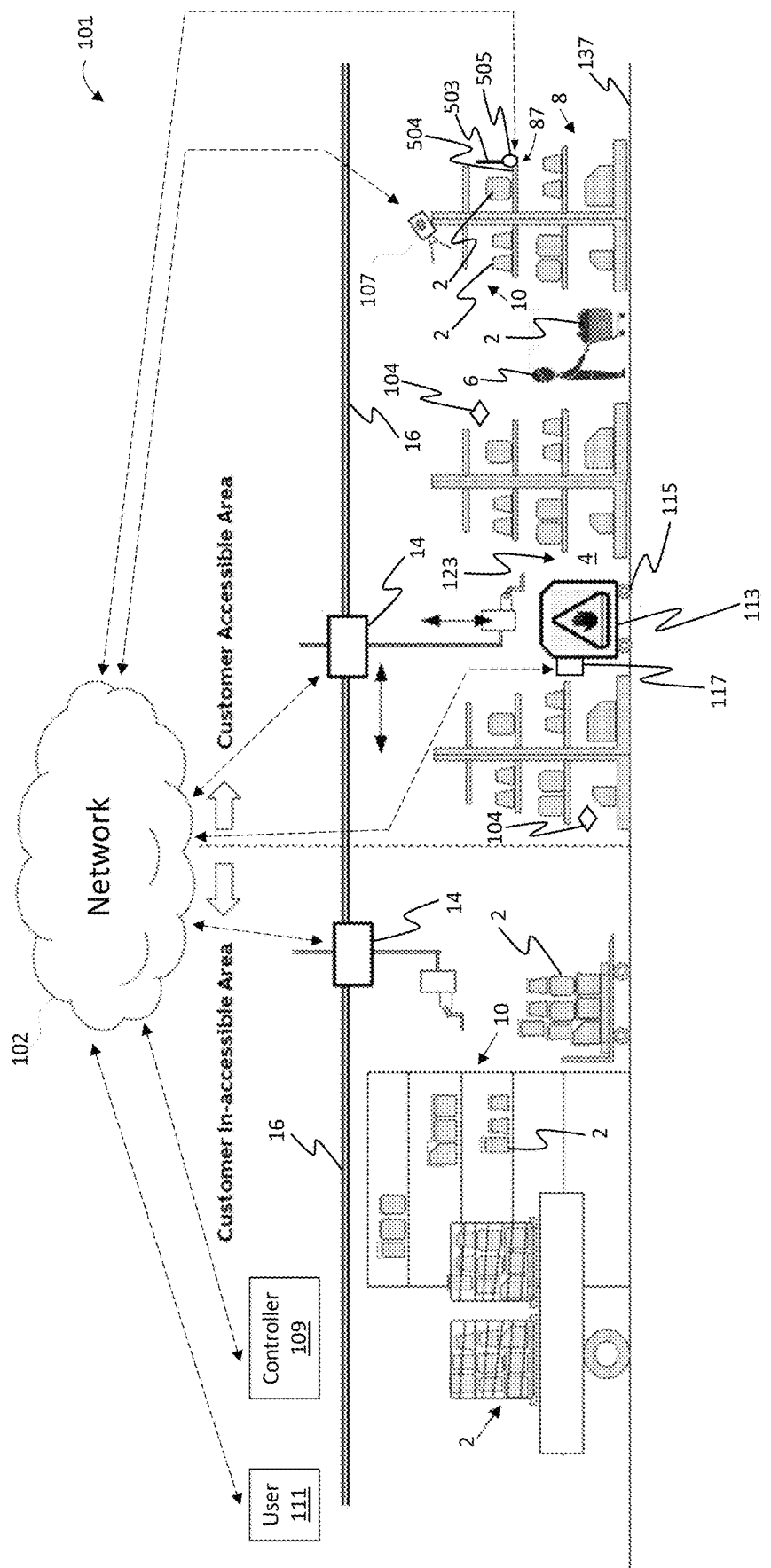
FIG. 5 is a schematic diagram of a system for restricting access to a space in a retail store environment before or during retail work operations in the space according to an embodiment of the disclosure.
Figure 6A:
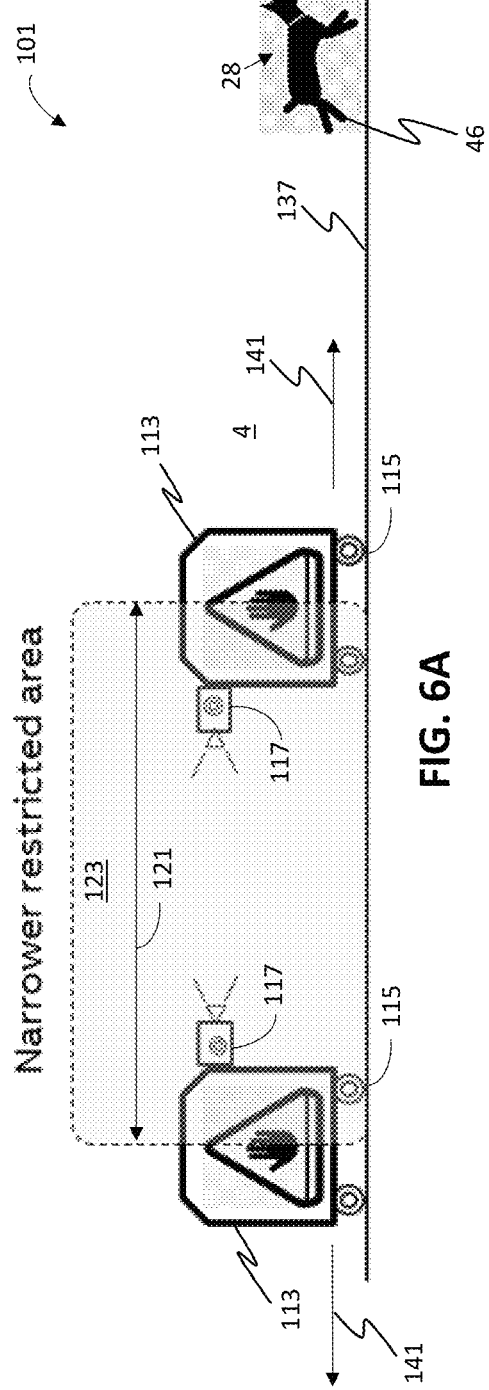
FIGS. 6A and 6B are schematic diagrams of portions of the system shown in FIG. 5 illustrating barrier robots for establishing customer-restricted zones of varying dimensions for restricting spaces proximal retail work operations according to an embodiment of the disclosure.
Figure 6B:
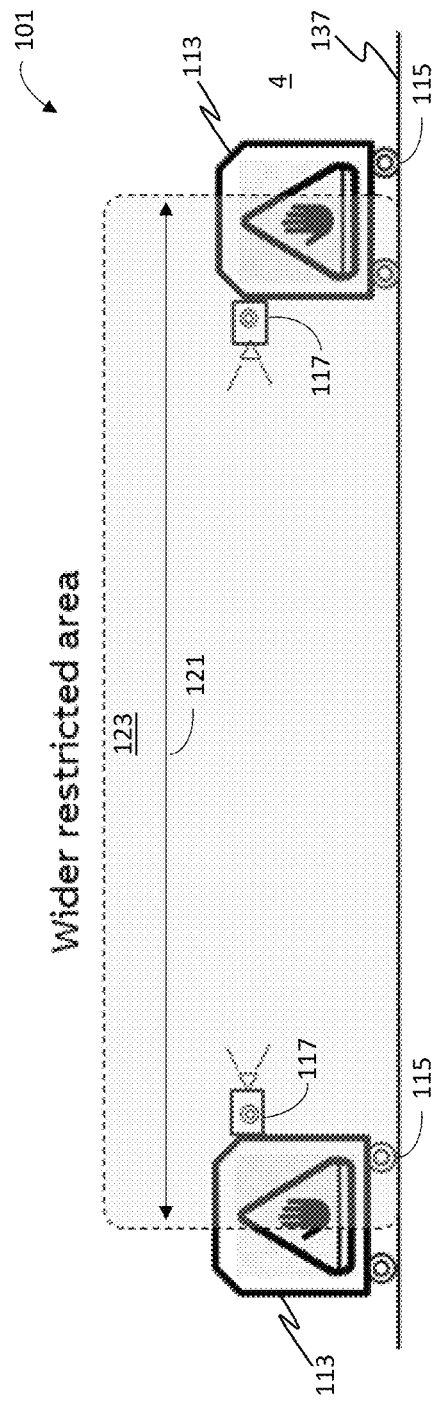
Figure 7B:
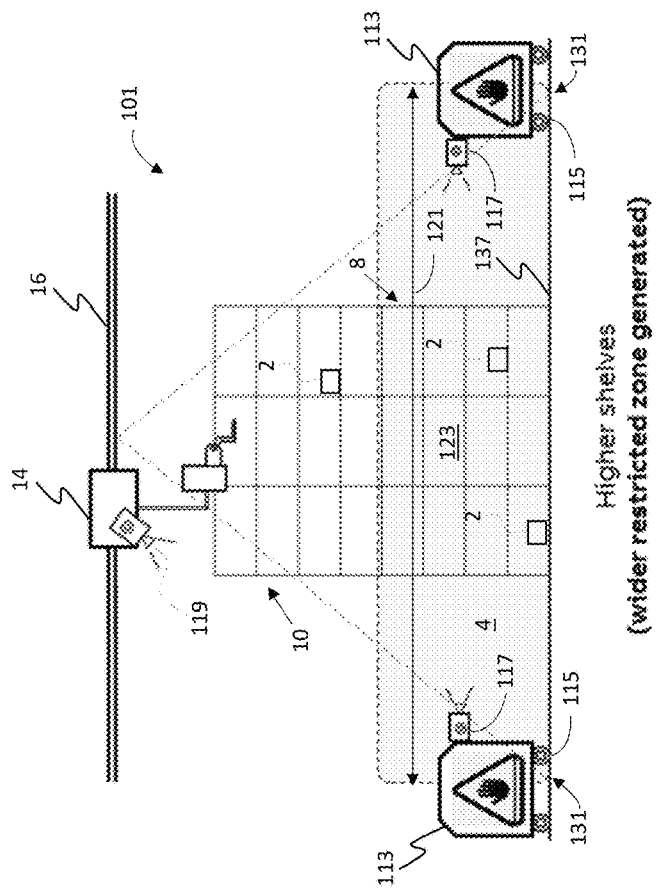
FIGS. 7A, 7B, 8, and 9 are schematic diagrams illustrating several types of retail work operations for which the system shown in FIGS. 5-6B may be advantageously applied.
Figure 7A:
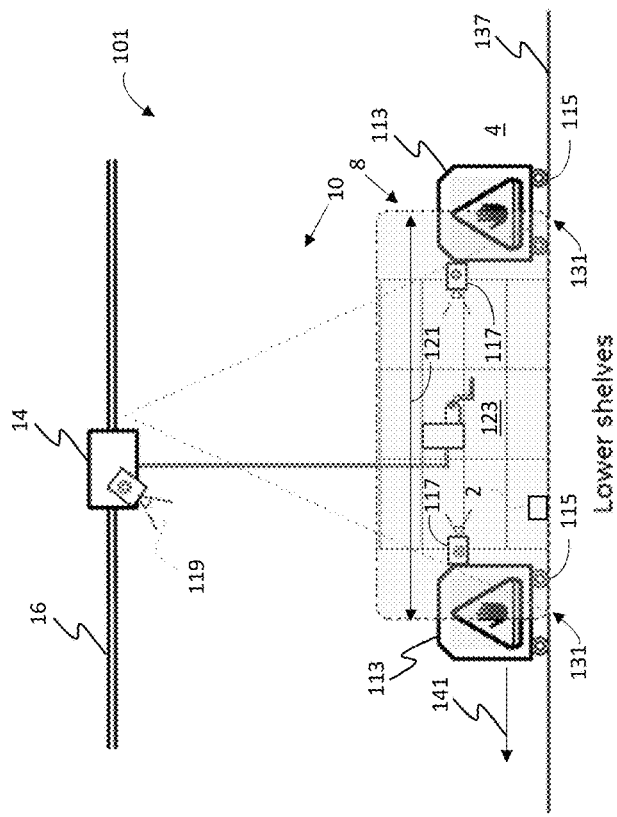
Figure 8:
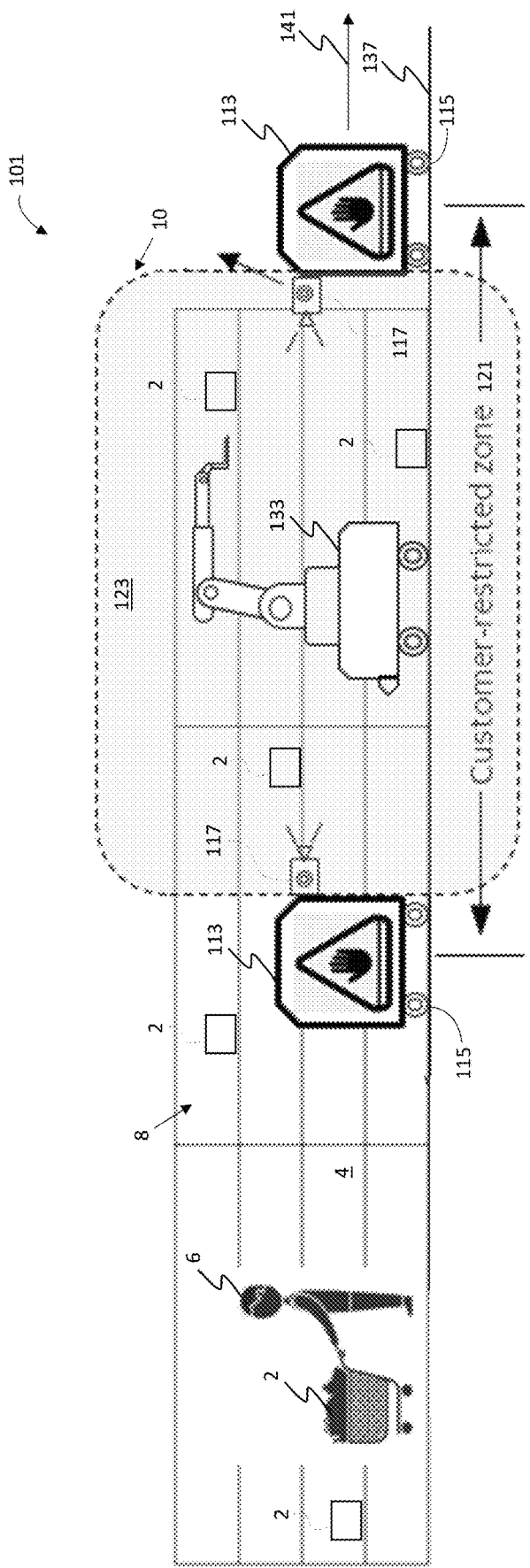
Figure 9:
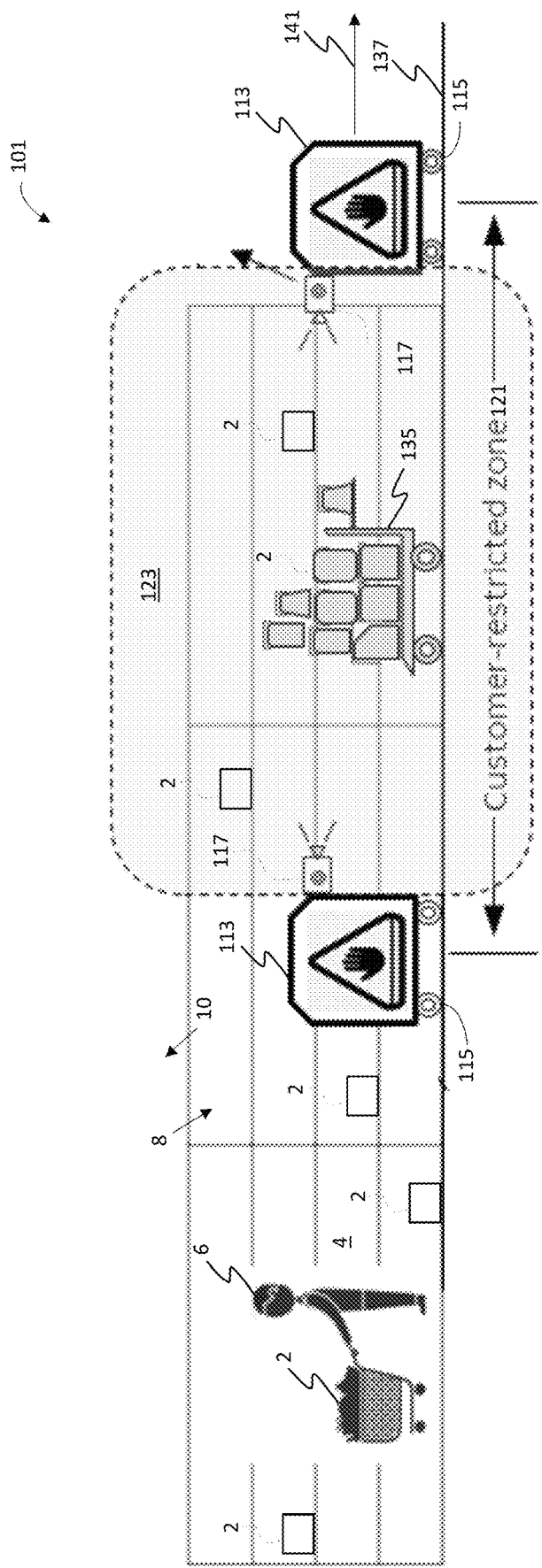
Figure 10A:
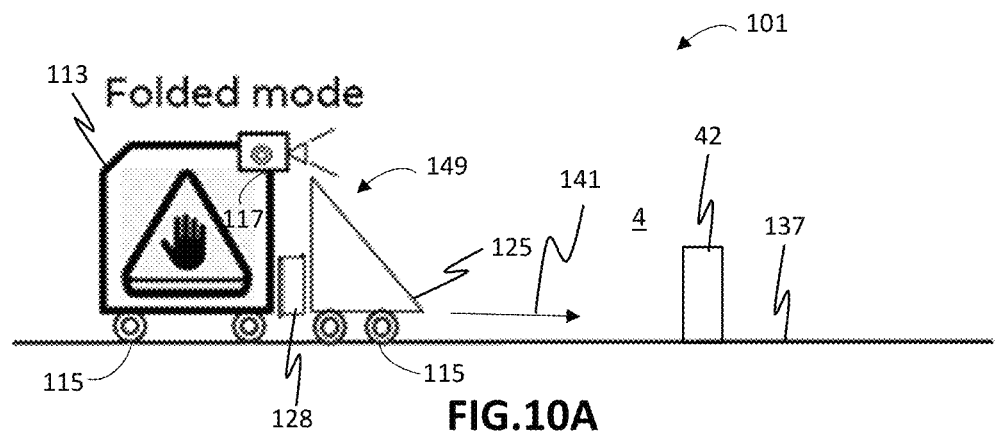
FIGS. 10A-10C are schematic diagrams of portions of the system shown in FIG. 5 illustrating a paired robot unit for establishing barriers proximal retail work operations according to an embodiment of the disclosure.
Figure 10B:
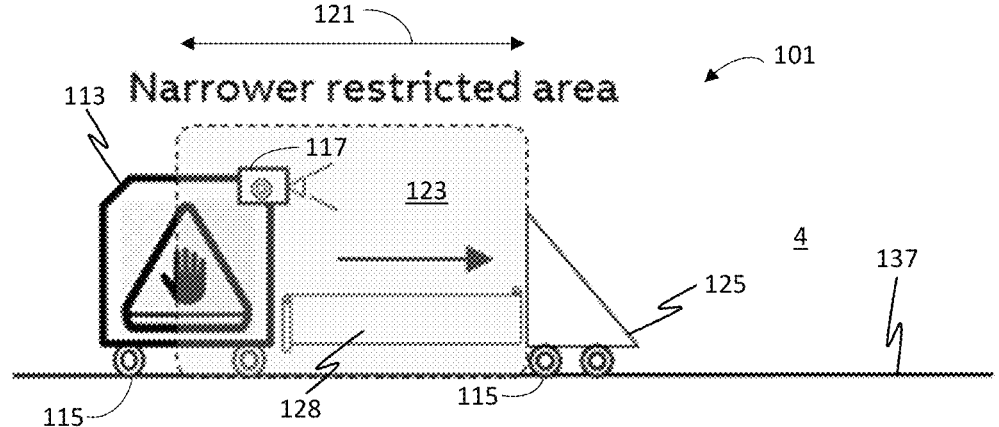
Figure 10C:
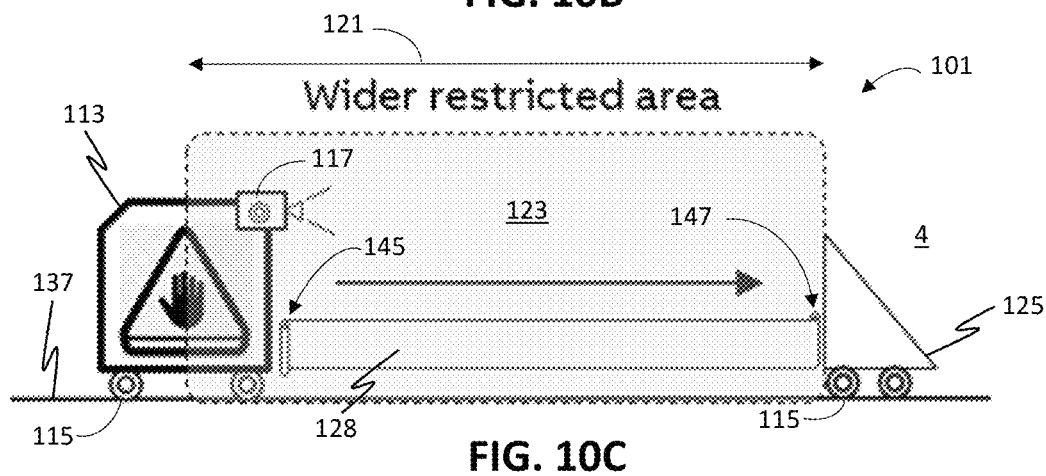
Figure 11:
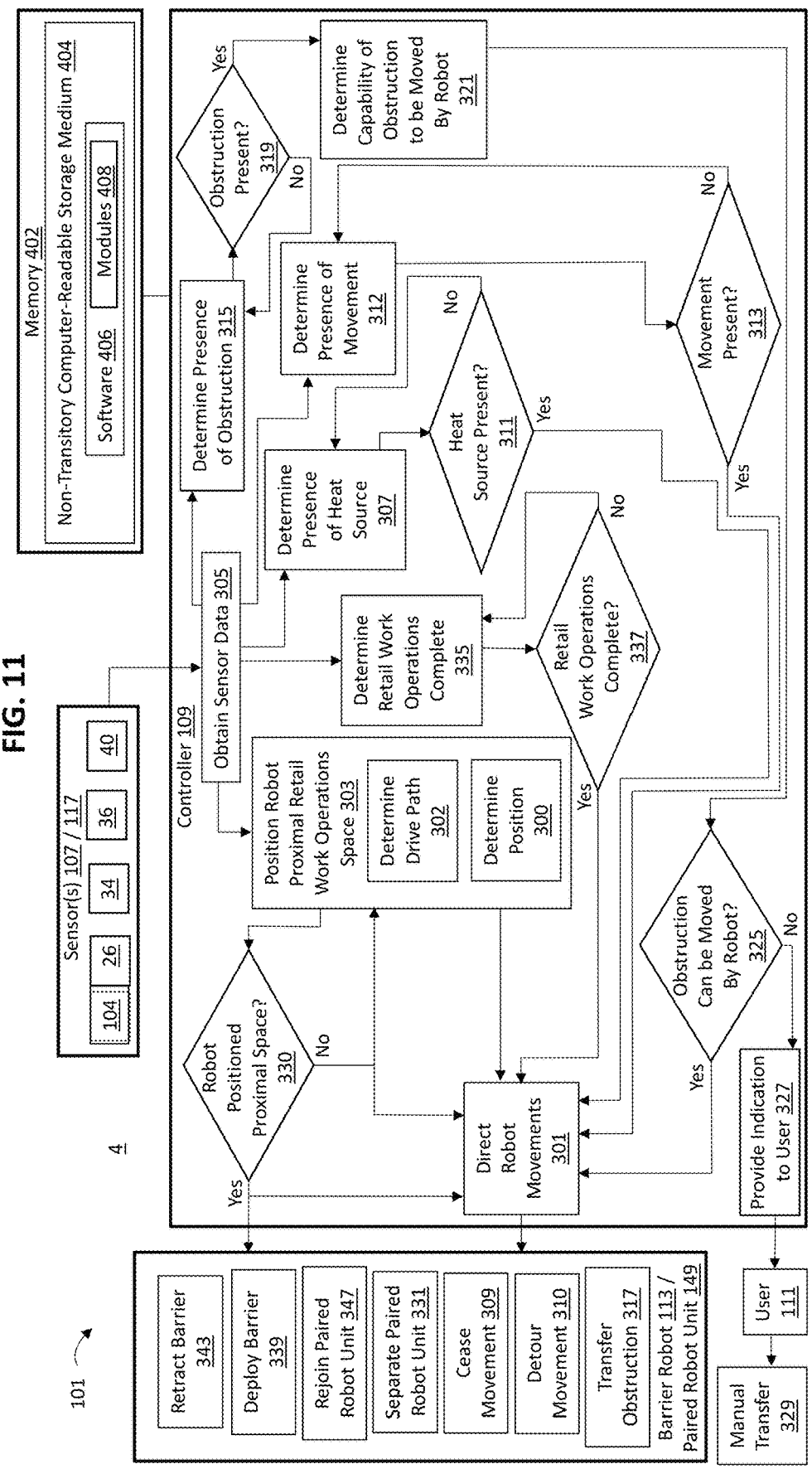
FIG. 11 is a flow chart illustrating aspects of operation of the system shown in FIGS. 1-10C according to embodiments of the disclosure.

FIG. 5 is a schematic diagram of a system (101) for restricting access to a space (123) in a retail store environment (4) before or during retail work operations in the space (123) according to an embodiment of the disclosure. FIGS. 6A and 6B are schematic diagrams of portions of the system (101) shown in FIG. 5 illustrating barrier robots (113) for establishing customer-restricted zones of varying dimensions for restricting spaces (123) proximal retail work operations according to an embodiment of the disclosure. FIGS. 7A, 7B, 8, and 9 are schematic diagrams illustrating several types of retail work operations for which the system (101)

shown in FIGS. 5-6B may be advantageously applied. FIGS. 10A-10C are schematic diagrams of portions of the system (101) shown in FIG. 5 illustrating a paired robot unit (149) for establishing barriers (128) proximal retail work operations according to an embodiment of the disclosure. FIG. 11 is a flow chart illustrating aspects of operation of the system (101) shown in FIGS. 5-10C according to embodiments of the disclosure.

Referring to FIGS. 5-11, the system (101) includes at least one mobile barrier robot (113) positioned on a floor (137) of the retail store environment (4). The system (101) includes at least one robot controller (109) in communication with the barrier robot(s) (113). In an example, barrier robot(s) (113) include motorized wheels (115) to facilitate movement about a floor (137) of the retail store environment (4). In an example, robot controller(s) (109) are also in communication with at least one user (111) of system (101). The system (101) includes at least one robot sensor (117) operably coupled to the barrier robot(s) (113) and in communication with robot controller(s) (109). System (101) includes at least one environment sensor (107) positioned in the retail store environment (4) and in communication with robot controller(s) (109). System (101) includes one or more memory devices (402) in communication with robot controller(s) (109).

Robot controller(s) (109) may be located in retail environment (4). Robot controller(s) (109) may be located remote from retail environment (4). Robot controller(s) (109) may be collocated with barrier robot(s) (113). Robot controller(s) (109) are programmed to implement and/or otherwise perform, at least in part, one or more of the disclosed steps, operations, and/or processes of system (101), including, without limitation, those shown and described with reference to FIGS. 5-11. Robot controller(s) (109) are capable of carrying out multiple functions in system (101). Robot controller(s) (109) include robotic movement control functionality, data processing, and data communication functionality, which may be implemented, at least in part, using one or more processors and/or other suitable computing devices and subsystems (not shown in FIGS. 5-11).

In an example, memory device(s) (402) include a non-transient computer-readable medium (404). Non-transient computer-readable medium (404) stores as software (406) computer-executable instructions for automatically restricting access to a space (123) in a retail store environment (4) before or during retail work operations in the space (123). In an example, computer-executable instructions stored as software (406) includes one or more software modules (408). When executed by the robot controller(s) (109) that are in communication with memory device(s) (402), barrier robot(s) (113), sensor(s) (107 and/or 117), and/or user(s) (111), the computer-executable instructions cause the robot controller(s) (109) to implement and/or otherwise perform, at least in part, one or more of the disclosed operations, steps, and/or processes of system (101).

In system (101), robot controller(s) (109), memory device(s) (402), barrier robot(s) (113), and/or user(s) (111) are in communication with one another via, and communicate with one another using signals (e.g., encoded data signals) sent and/or received through, a network (102). Communication among and between robot controller(s) (109), memory device(s) (402), barrier robot(s) (113), robot sensor(s) (107 and/or 117), and/or user(s) (111) is facilitated by transceivers (not shown in FIGS. 5-11). In an example, system (101) communication using network (102) includes wireless communication equipment and protocols. In another example, system (101) communication using network (102) includes wired communication equipment and protocols. In yet another example, system (101) communication using network (102) includes a combination of wireless and wired communication equipment and protocols. In an example, system (101) communication includes wireless and/or wired communication equipment and protocols for utilizing cloud-based processing, storage, and/or communication resources. In an example, system (101) communication utilizes the Internet, including, without limitation, Internet of Things (IoT) protocols, practices, and/or standards.

In operation of system (101), the at least one robot controller (109) directs (301) autonomous movements of the barrier robot(s) (109) to facilitate positioning (303) the barrier robot(s) (113) on the floor (137) proximal the space (123) to at least partially enclose the space (123) before or during the retail work operations therein. In an example, the one or more robot sensors (117) facilitate the robot controller (109) obtaining (305) data representative of a position on the barrier robot (113) on the floor (137). In an example, the robot sensor(s) (117) include GPS transceivers, motor encoders, and/or imaging sensor-based navigational subsystems for providing positional data to the robot controller(s) (109). In another example, the robot sensor(s) (117) include transceivers for use by robot controller(s) (109) for coordinating navigation of barrier robot(s) (113) about the floor (137) in conjunction with, for instance, RFID devices (104) positioned in a plurality of locations throughout the retail store environment (4).

In the example, robot controller(s) (109) direct (301) the autonomous movements of the barrier robot(s) (109) to position (303) the barrier robot(s) (113) on the floor (137) proximal the space (123) in response to the data obtained from the one or more sensors (107 and/or 117). For positioning (303) the barrier robot(s) (113) proximal space (123) and/or elsewhere on the floor (137), robot controller(s) (109) determine (302) a drive path (141) for barrier robot(s) (113) through the retail store environment (4). In addition to determining (302) the drive path (141) based on a determined (300) (e.g., present) position of barrier robot(s) (113), robot controller(s) (109) may take account of obstacles (42), customer (6) activity levels, priority levels of retail store work operations, and/or user (111)-determined guidelines in determining (302) the drive path (141). In an example, such information used by robot controller(s) (109) for determining (100) position and determining the drive path (141) is obtained (305) from sensor(s) (107 and/or 117). User(s) (111) may periodically store and/or update this information in the memory device(s) (402).

In an example, the one or more sensors (107 and/or 117) of system (101) facilitate the robot controller(s) (109) obtaining (305) data representative of the position on the barrier robot(s) (113) on the floor (137). In the example, the robot controller(s) (109) direct (301) the autonomous movements of the barrier robot(s) (113) to further facilitate positioning (303) the barrier robot(s) (113) on the floor (137) proximal the space (123) before or during the retail work operations therein in response to the data obtained from the one or more sensors (107 and/or 117). In embodiments for which the directing (301), positioning (303), determining (300 and/or 302), and/or obtaining (305) step(s) is/are implemented and/or otherwise performed in system (101) by software (406), robot controller(s) (109) execute computer-executable instructions stored in directing, positioning, position determining, drive path determining, and/or obtaining module(s) (408), respectively. In this manner, robot controller(s) (109) continually monitor the retail store environment (4) and position(s) of barrier robot(s) (113) to ensure the barrier robot(s) (113) reach their assigned destinations in a safe and efficient manner, and without undue interference with the customer (6) experience.

In an example, sensor(s) (107 and/or 117) include at least one computer vision device (26). In the example, computer vision device(s) (26) are positioned in view of the floor (137). In the example, the data representative of the position on the barrier robot (113) on the floor (137) includes images of the floor (137). So, for instance, robot controller(s) (109) may determine (300) the position(s) and/or determine (302) drive path(s) of barrier robot(s) (113) by analyzing the obtained (305) images thereof (e.g., using image recognition algorithms, including without limitation, incorporating machine learning and/or artificial intelligence schemes). In embodiments for which this image analysis operation is implemented and/or otherwise performed in system (101) by software (206), robot controller(s) (109) execute computer-executable instructions stored in an image analysis module (408).

In an embodiment, actual or potential obstruction (42) to the autonomous movements of the barrier robot(s) (113) proximal the drive path (141) and/or proximal space (123) is or includes a heat source (28). In an example, the one or more sensors (107 and/117) of system (101) facilitate the robot controller(s) (109) obtaining (305) data representative of a presence of the heat source (28) proximal the drive path (141) and/or proximal space (123), as shown in FIG. 6A. In an example, the robot controller(s) (109) further facilitate determining (307) the presence of the heat source (28) proximal the drive path (141) and/or proximal space (123) based on the data obtained from the one or more sensors (107 and/or 117). The robot controller(s) (109) direct (201) the autonomous movements of the barrier robot(s) (113) to at least one of: cease (309), and detour (310), in response to determining (307) the presence of the heat source (28) proximal the drive path (141) and/or proximal space (123).

In the example, robot controller(s) (109) direct (301) the autonomous movements of barrier robot(s) (113) to cease (309) and/or detour (310) upon determining (307), using logic branch (311), that the heat source (28) is present proximal the drive path (141) and/or proximal space (123). Otherwise, upon robot controller(s) (309) determining (307) that heat source (28) is not present proximal drive path (141) and/or proximal space (123), logic branch (311) operates in system (101) to return the robot controller(s) (109) back to the determining (307) step. In embodiments for which the determining (307), ceasing (309), and/or detouring (310) step(s) is/are implemented and/or otherwise performed in system (101) by software (406), robot controller(s) (109) execute computer-executable instructions stored in heat source determining, ceasing, and/or detouring module(s) (408), respectively. In this manner, robot controller(s) (109) continually monitor drive path (141) and/or space (123), and/or regions proximal thereto, for heat sources which may indicate customer (6) (or their pets, if applicable) presence therein and may take immediate action to cease (309) and/or detour (310) movements of barrier robot(s) (113) on an as needed basis to ensure safety and comfort in the retail store environment (4).

In an example, the one or more sensors (107 and/or 117) include a thermal sensor (34) positioned in view of the drive path (141) for sensing a presence of a warm-blooded animal (46) (e.g., as the heat source (28)) proximal the drive path (141) and/or proximal space (123). In the example, the robot controller(s) (18) further facilitate determining (307) the presence of the heat source (28) as the presence of the warm-blooded animal (46) proximal the drive path (141) and/or proximal space (123) based on the data obtained from the thermal sensor (34). In embodiments for which this aspect of the determining (307) step is implemented and/or otherwise performed in system (101) by software (406), robot controller(s) (109) execute computer-executable instructions stored in a warm-blooded animal presence determining module (408).

In an embodiment, the obstruction (42) is or includes a moving object (e.g., customer (6)). In an example, the one or more sensors (107 and/or 117) of system (101) facilitate the robot controller(s) (109) obtaining (305) data representative of a presence of movement proximal the drive path (141) and/or proximal space (123). In an example, the robot controller(s) (109) further facilitate determining (312) the presence of movement proximal drive path (141) and/or proximal space (123) based on the data obtained (305) from the one or more sensors (107 and/or 117). The robot controller(s) (109) direct (301) the autonomous movements of the barrier robot(s) (113) to at least one of: cease (309), and detour (310), in response to determining (312) the presence of movement proximal the drive path (141) and/or proximal space (123).

In the example, robot controller(s) (18) direct (301) the autonomous movements of barrier robot(s) (113) to cease (309) and/or detour (310) upon determining (312), using logic branch (313), the presence of movement proximal drive path (141) and/or proximal space (123). Otherwise, upon robot controller(s) (109) determining (312) that no movement is present proximal drive path (141) and/or proximal space (123), logic branch (313) operates in system (101) to return the robot controller(s) (109) back to the determining (312) step. In an example, the one or more sensors (107 and/or 117) include at least one of: a motion sensor (36), a computer vision device (26), and a three-dimensional (3D) scanner (40). These sensor(s) (36, 26, and/or 40) are positioned in view of the drive path (141) and/or space (123) for sensing the presence of movement proximal thereto. In the example, the robot controller(s) (109) further facilitate determining (312) the presence of movement proximal the drive path (141) and/or proximal space (123) based on the data obtained from the motion sensor (36), computer vision device (26), and/or 3D scanner (40).

In embodiments for which the determining (312), ceasing (309), and/or detouring (310) step(s) is/are implemented and/or otherwise performed in system (101) by software (406), robot controller(s) (109) execute computer-executable instructions stored in movement determining, ceasing, and/or detouring module(s) (408), respectively. In this manner, robot controller(s) (109) continually monitor the drive path (141) and/or space (123), and/or regions proximal thereto, for presence of movement which may indicate customer (6) (or their pets, if applicable) presence therein and may take immediate action to cease (309) and/or detour (310) movements of barrier robot(s) (113) on an as needed basis to ensure customer (6) safety and comfort in the retail store environment (4).

In an embodiment, the one or more sensors (107 and/or 117) facilitate the robot controller (109) obtaining (305) data representative of a presence of the actual or potential obstruction (42) to the autonomous movements of the barrier robot(s) (113) proximal the drive path (141) and/or proximal space (123), as shown in FIG. 10A. In an example, the robot controller(s) (109) further facilitate determining (315) the presence of the obstruction (42) proximal the drive path (141) and/or proximal space (123) based on the data obtained from the one or more sensors (107 and/or 117). The robot controller(s) (109) direct (301) the autonomous movements of the barrier robot(s) (113) to transfer (317) the obstruction (42) out of the drive path (141) and/or out of the space (123) in response to determining (315) the presence of the obstruction (42) proximal the drive path (141) and/or proximal the space (123).

In an example, robot controller(s) (109) direct (301) the autonomous movements of the barrier robot(s) (113) to transfer (317) the obstruction (42) out of the drive path (141) and/or out of the space (123) upon determining (315), using logic branch (319), the presence of the obstruction (42) proximal drive path (141) and/or proximal space (123). Otherwise, upon robot controller(s) (109) determining (315) that no obstruction (42) is present proximal drive path (141) and/or proximal space (123), logic branch (319) operates in system (101) to return the robot controller(s) (109) back to the determining (315) step. In embodiments for which the determining (315) and/or transferring (317) step(s) is/are implemented and/or otherwise performed in system (101) by software (406), robot controller(s) (109) execute computer-executable instructions stored in obstruction determining and/or transferring module(s) (408), respectively. In this manner, robot controller(s) (109) continually monitor the drive path (141) and/or space (123), and/or regions proximal thereto, for presence of actual or potential obstructions which may impede or otherwise undesirably impact movements of barrier robot(s) (113) and takes responsive action on an as needed basis to ensure continuous, safe, and efficient barrier robot (113) and retail work operations in the retail store environment (4).

In an embodiment, the obstruction (42) is or includes a stationary object. In an example, the one or more sensors (107 and/or 117) include at least one of: the motion sensor (36), the computer vision device (26), and the 3D scanner (40). These sensor(s) (36, 26, and/or 40) are positioned in view of the drive path (141) and/or space (123) for sensing the presence of obstruction(s) (42) proximal drive path (141) and/or proximal space (123). In the example, the robot controller(s) (109) further facilitate determining (315) the presence of obstruction(s) (42) (e.g., stationary and/or moving objects) proximal drive path (141) and/or proximal space (123) based on the data obtained from the motion sensor (36), computer vision device (26), and/or 3D scanner (40).

In an example, the robot controller(s) (109) further facilitate determining (321) a capability of the obstruction (42) to be moved (e.g., transferred (317) out of the drive path (141) and/or out of the space (123) by the barrier robot(s) (113) based on the data representative of the presence of the obstruction (42). In the example, the process of robot controller(s) (109) determining (321) the capability of the obstruction (42) to be moved out of the drive path (141) and/or out of the space (123) by the barrier robot(s) (113) utilizes logic branch (325). If the obstruction (42) is determined (321) by robot controller(s) (109) to be so movable by barrier robot(s) (113), robot controller(s) (109) direct (301) the autonomous movements of the barrier robot(s) (113) to transfer (317) the obstruction (42) out of the drive path (141) and/or out of the space (123). Otherwise, upon robot controller(s) (109) determining (321) that obstruction (42) cannot be so moved out of drive path (141) and/or out of space (123) by barrier robot(s) (113), the robot controller(s) (109) further facilitate providing (327) an indication (e.g., lights, sounds, and/or messages) to user(s) (11) of the system (101) of a need to manually transfer (329) the obstruction (42) out of the drive path (141) and/or out of the space (123). In embodiments for which the determining (321) and/or providing (327) step(s) is/are implemented and/or otherwise performed in system (101) by software (406), robot controller(s) (109) execute computer-executable instructions stored in transfer capability determining and/or providing module(s) (408), respectively. In this manner, robot controller(s) (109) implement responsive actions and/or provide notifications to user(s) (11) regarding obstructions (42) in drive path (141) and/or space (123) and/or regions proximal thereto to ensure continuous, safe, and efficient barrier robot (113) and retail work operations in the retail store environment (4).

In an embodiment, the barrier robot (113) includes a companion robot (125) operably coupled to the barrier robot (113), as shown in FIGS. 10A-10C. In an example, robot controller(s) (109) direct (301) the autonomous movements of the barrier robot (113) and the companion robot (125) proximal the space (123) and/or otherwise about the floor (137) as a paired robot unit (149). One or a plurality of paired robot units (149) may be deployed in retail store environment (4) by user(s) (111) of system (101). In an example, companion robot(s) (149) include motorized wheels (115) to facilitate movement about the floor (137) of the retail store environment (4). In the embodiment, robot controller(s) (109) direct (301) the autonomous movements of the barrier robot (113) and/or the companion robot (125) to separate (331) from one another on the floor (137). In an example, robot controller(s) (109) direct (301) this separating (331) movement process upon determining (300), using logic branch (330), the paired robot unit (149) being positioned (303) proximal the space (123). Otherwise, logic branch (330) directs robot controller(s) (109) back to the directing (301) and positioning (303) processes, including, for example, the drive path (302) and position (300) determining subprocesses, until such time that the paired robot unit (149) is positioned (303) proximal space (123). The as-separated (331) barrier robot (113) and companion (125) robots together define a customer-restricted zone (121) restricting customer (6) access to the space (123) before or during the retail work operations therein. The dimensions of this customer-restricted zone (121) established by the barrier (113) and companion (125) robots may be flexibly adjusted, as needed, by the particular distance and/or angle therebetween.

In an example, the robot controller(s) (109) direct (301) the autonomous movements of the barrier robot (113) and the companion robot (125) to recouple (333) to one another to at least partly dismantle the customer-restricted zone (121) by the as-separated (331) paired robot unit (149). In an example, robot controller(s) (109) direct (301) this recoupling (333) movement process upon determining (335), using logic branch (337), that the retail work operations in the space (123) are completed or suspended, and/or space (123) is otherwise safe to enter. Otherwise, logic branch (337) directs robot controller(s) (109) back to the determining (335) step in system (101). In an example, robot controller(s) (109) may determine (335) this work completion and/or safe-to-enter status and/or condition of space (123) based on data obtained (305) from sensor(s) (107 and/or 117). In embodiments for which the separating (331), recoupling (333), and/or determining (335) step(s) is/are implemented and/or otherwise performed in system (101) by software (406), robot controller(s) (109) execute computer-executable instructions stored in separating, recoupling, and/or work completion determining module(s) (408), respectively.

In an embodiment, the barrier robot (113) includes a deployable retractable barrier (128) operably coupled to the barrier robot (113), as shown in FIGS. 10A-10C. In the embodiment, the robot controller(s) (109) direct (301) the autonomous movements of the barrier robot(s) (113) to deploy (339) (unfold the barrier (128) including, for example and without limitation, in an accordion-like manner) the barrier (128) to construct the customer-restricted zone (121). In an example, robot controller(s) (109) direct this barrier (128) deploying (339) movement upon determining (300), using logic branch (330), the barrier robot(s) (113) being positioned (303) proximal space (123). Otherwise, logic branch (330) directs robot controller(s) (109) back to the directing (301) and positioning (303) processes, including, for example, the drive path (302) and position (300) determining subprocesses, until such time that barrier robot(s) (113) is/are positioned (303) proximal space (123). In this embodiment, the as-deployed (339) barrier (128) and the barrier robot (113) together define the customer-restricted zone (121) restricting customer (6) access to the space (123) before or during the retail work operations therein. The dimensions of this customer-restricted zone (121) established by the as-deployed (339) barrier (128) and barrier robot (113) may be flexibly adjusted, as needed, by the particular distance and/or angle therebetween.

In an example, the robot controller(s) (109) direct (301) the autonomous movements of the barrier robot (113) to retract (343) the barrier (128) to at least partly dismantle the customer-restricted zone (121). In an example, robot controller(s) (109) direct (301) this retracting (343) movement process upon determining (335), using logic branch (337), that the retail work operations in the space (123) are completed or suspended, and/or space (123) is otherwise safe to enter. Otherwise, logic branch (337) directs robot controller(s) (109) back to the determining (335) step in system (101). In an example, robot controller(s) (109) may determine (335) this work completion and/or safe-to-enter status and/or condition of space (123) based on data obtained (305) from sensor(s) (107 and/or 117). In an example, these deploying (339) and/or retracting (342) movement processes are implemented in system (101) using a barrier actuator (not shown in FIGS. 10A-10C) that is positioned in or on barrier robot (113) and operably coupled to barrier (128) to facilitate deployment (339) and/or retraction (343) thereof. In embodiments for which the deploying (333) and/or retracting (343) step(s) is/are implemented and/or otherwise performed in system (101) by software (406), robot controller(s) (109) execute computer-executable instructions stored in a deploying and/or retracting module(s) (408), respectively.

In an embodiment, the barrier (128) includes a first end (145) operably coupled to the barrier robot (113). In the embodiment, the barrier robot (113) further includes the companion robot (125) operably coupled to a second end (147) of the barrier (128), as shown in FIGS. 10A-10C. In an example, the robot controller(s) (109) direct (301) the autonomous movements of the barrier robot (113) and the companion robot (125) proximal the space (123) as the paired robot unit (149). In an example, robot controller(s) (109) direct (301) the autonomous movements of the barrier robot (113) and/or the companion robot (125) to separate (331) from one another on the floor (137) to expand the barrier (128). This separating (331) movement operation is implemented upon determining (300), using logic branch (330) the paired robot unit (149) being positioned (303) proximal space (123). Otherwise, logic branch (330) directs robot controller(s) (109) back to the determining (300) step in system (101). The expanded barrier (128) and the as-separated (331) barrier (113) and companion (125) robots together define the customer-restricted zone (121) restricting customer (6) access to the space (123) before or during the retail work operations therein. The dimensions of this customer-restricted zone (121) established by the as-expanded barrier (128) and the as-separated (331) barrier (113) and companion (125) robots may be flexibly adjusted, as needed, by the particular distance and/or angle therebetween.

In an example, the robot controller(s) (109) direct (301) the autonomous movements of the barrier robot (113) and/or the companion robot (125) to rejoin (347) each other on the floor (137) to retract the barrier (128) (fold the barrier (128) including, for example and without limitation, in an accordion-like manner). In an example, robot controller(s) (109) direct (301) this rejoining (347) movement process upon determining (335), using logic branch (337), that the retail work operations in the space (123) are completed or suspended, and/or space (123) is otherwise safe to enter. Otherwise, logic branch (337) directs robot controller(s) (109) back to the determining (335) step in system (101). In an example, robot controller(s) (109) may determine (335) this work completion and/or safe-to-enter status and/or condition of space (123) based on data obtained (305) from sensor(s) (107 and/or 117). In embodiments for which the rejoining (347) step is implemented and/or otherwise performed in system (101) by software (406), robot controller(s) (109) execute computer-executable instructions stored in a rejoining module (408). In an example, the robot controller(s) (109) further facilitate directing (301) the autonomous movements of the barrier robot(s) (113) (with or without paired companion robot(s) (125)) away from the space (123) during or after the retail work operations and/or unsafe conditions within or proximal the space (123).

In an embodiment, system (101) includes a plurality of mobile barrier robots (113) positioned on the floor (137) of the retail store environment (4). In the embodiment, the robot controller (109) is in communication with the plurality of barrier robots (113) for directing (301) the autonomous movements thereof to facilitate positioning (303) at least two of the plurality of barrier robots (113) on the floor (137) proximal the space (123) before or during the retail work operations therein. In an example, the as-positioned (303) two or more barrier robots (113) define a customer-restricted zone (121) restricting customer (6) access to the space (123) before or during the retail work operations therein. In this embodiment, the various operations, steps, and/or processes described above in the context of individual barrier robots (113), including, where applicable, with companion robots (125) as paired robot units (149), are generally applicable to the plurality of barrier robots (113), either standing alone or as groups of two or more barrier robots (113).

Referring to FIG. 5, in an embodiment, the customer (6)-inaccessible storage (10) for the items (2) includes a storage location (504) for storing at least one of the items (2). Storage location(s) (504) include, for example and without limitation, shelves, covers, compartments, cages, lofts, hangers, bins, and drawers. In the embodiment, the system (101) further includes a barrier device (503) for alternately enabling and restricting access to the storage location (504) (and the item(s) (2) stored therein). In an example, the barrier device (503) is a passive device that is operably coupled to at least a portion of the storage location (504) as, for example, by way of one or more hinges (87). In the example, the passive barrier device (503) may include a locking and/or other mechanism for securing the barrier device (503) in a closed position for restricting access to the storage location (504). In the example, the gantry robot(s) (14) include robot arms and/or grippers (not shown in FIG. 5) configured to manipulate the passive barrier device (503)

for purposes of alternately opening and closing the passive barrier device (503), including, without limitation, by operating the locking and/or other mechanism for securing the barrier device (503) in the closed position.

In another example, the system (101) of this embodiment includes a barrier actuator (505) in communication with the robot controller (18). The barrier actuator (505) is operably coupled to: the barrier device (503), and at least a portion of the storage location (504). In the example, the barrier actuator (505) is or includes a controllable bi-directional electric motor facilitating rotation of barrier device (503) about hinge(s) (87) coupled to and between at least a portion of storage location (504) and barrier device (503). In an example, the robot controller (109) further facilitates directing, using the barrier actuator (505), autonomous movements of the barrier device (503) to alternately open and close the barrier device (503). In another example, the robot controller (109) further facilitates directing (201) the autonomous movements of the gantry robot(s) (14) to alternately open and close the barrier device (503). The barrier actuator (505) may be manually operable by user(s) (20), including, without limitation, by way of a switch (not shown in FIG. 5) to control flow and/or directionality of electric current to barrier actuator (505). Alternately opening and closing the barrier device (503) facilitates alternately enabling and restricting the access the storage location (504).

Figure 12:
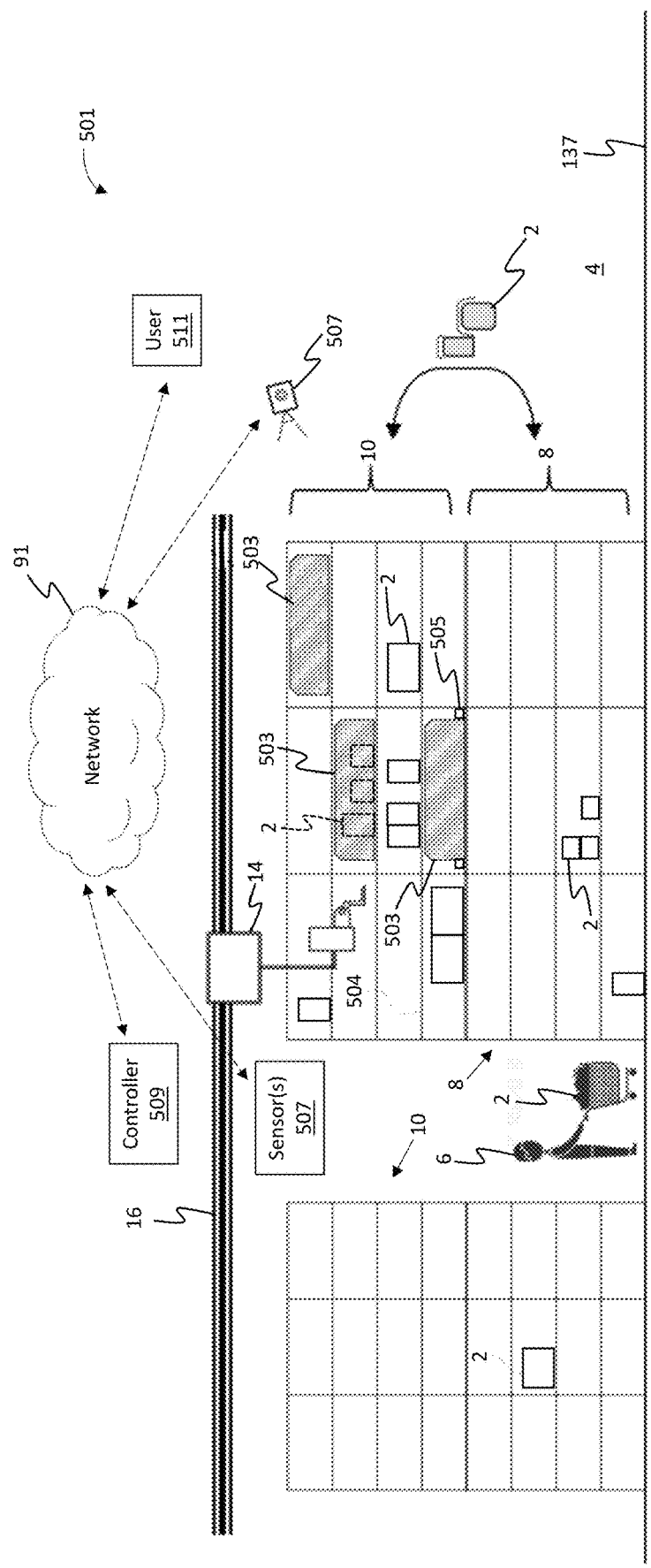
FIG. 12 is a schematic diagram of a system for securing items in a retail store environment having customer-accessible POS locations for the items and customer-inaccessible storage for the items according to an embodiment of the disclosure.
Figure 14:
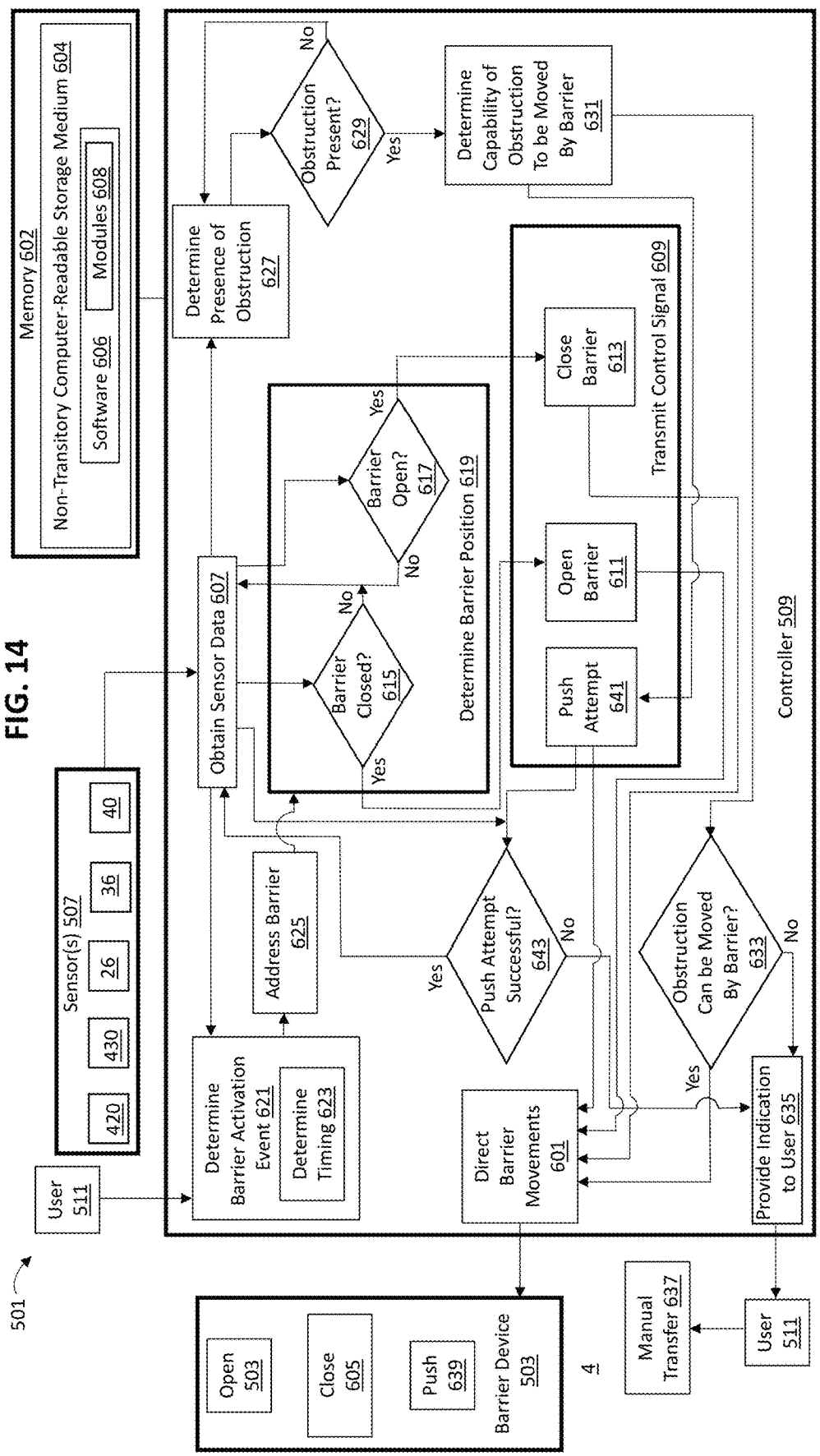
FIG. 14 is a flow chart illustrating aspects of operation of the system shown in FIGS. 12-13D according to embodiments of the disclosure.

FIG. 12 is a schematic diagram of a system (501) for securing items (2) in a retail store environment (4) having customer (6)-accessible POS locations (8) for the items (2) and customer-inaccessible storage (10) for the items (2) according to an embodiment of the disclosure. FIGS. 13A-13D are schematic diagrams of the system (501) shown in FIG. 12 illustrating an obstruction (69) to an open-to-closed position movement path (99) of a barrier device (503) according to an embodiment of the disclosure. FIG. 14 is a flow chart illustrating aspects of operation of the system (501) shown in FIGS. 12-13D according to embodiments of the disclosure.

Referring to FIGS. 12-14, the system (501) includes at least one barrier device (503) positioned proximal to and operably coupled to at least a portion of one or more storage locations (504) of the customer (6)-inaccessible storage (10). In an example, barrier device(s) (503) is/are rotatably coupled to at least a portion of at least one storage location (504) by way of one or more barrier actuators (505) (e.g., controllable bi-directional electric motors and/or robotic arms). The system (501) includes at least one barrier actuator (505). The system (501) includes at least one barrier controller (509) in communication with the barrier actuator(s) (505). In an example, barrier controller(s) (509) are also in communication with at least one user (511) of system (501). The system (501) includes at least one barrier sensor (507) positioned on or in, and/or operably coupled to, at least one of: barrier device(s) (503), storage locations (504), barrier actuator(s) (505), item(s) (2), storage (10), and elsewhere in retail store environment (4). Barrier sensor(s) (507) are in communication with barrier controller(s) (509). System (501) includes one or more memory devices (602) in communication with barrier controller(s) (509).

Barrier controller(s) (509) may be located in retail environment (4). Barrier controller(s) (509) may be located remote from retail environment (4). Barrier controller(s) (509) may be collocated with barrier device(s) (503). Barrier controller(s) (509) are programmed to implement and/or otherwise perform, at least in part, one or more of the disclosed steps, operations, and/or processes of system (501), including, without limitation, those shown and described with reference to FIGS. 12-14. Barrier controller(s) (509) are capable of carrying out multiple functions in system (501). Barrier controller(s) (509) include motor actuation and/or robotic movement control functionality, data processing, and data communication functionality, which may be implemented, at least in part, using one or more processors and/or other suitable computing devices and subsystems (not shown in FIGS. 12-14).

In an example, memory device(s) (602) include a non-transient computer-readable medium (604). Non-transient computer-readable medium (604) stores as software (606) computer-executable instructions for automatically securing items (2) in the retail store environment (4) having customer (6)-accessible POS locations (8) for the items (2) and customer-inaccessible storage (10) for the items (2). In an example, computer-executable instructions stored as software (606) includes one or more software modules (608). When executed by the robot controller(s) (509) that are in communication with memory device(s) (602), barrier actuator(s) (505), barrier sensor(s) (507), and/or user(s) (511), the computer-executable instructions cause the robot controller(s) (109) to implement and/or otherwise perform, at least in part, one or more of the disclosed operations, steps, and/or processes of system (501).

In system (101), robot controller(s) (109), memory device(s) (402), barrier robot(s) (113), and/or user(s) (111) are in communication with one another via, and communicate with one another using signals (e.g., encoded data signals) sent and/or received through, a network (91). Communication among and between robot controller(s) (109), memory device(s) (402), barrier robot(s) (113), barrier sensor(s) (507), and/or user(s) (111) is facilitated by transceivers (not shown in FIGS. 12-14). In an example, system (501) communication using network (91) includes wireless communication equipment and protocols. In another example, system (501) communication using network (91) includes wired communication equipment and protocols. In yet another example, system (501) communication using network (91) includes a combination of wireless and wired communication equipment and protocols. In an example, system (501) communication includes wireless and/or wired communication equipment and protocols for utilizing cloud-based processing, storage, and/or communication resources. In an example, system (501) communication utilizes the Internet, including, without limitation, Internet of Things (IoT) protocols, practices, and/or standards.

In operation of system (501), the at least one barrier controller (509) directs (601) autonomous movements of the barrier device(s) (503) to facilitate alternately opening (603) and closing (605) the barrier device(s) (503). These alternate open (603) and close (605) motions of barrier device(s) (503) may also be commanded by user(s) (511) either instead of, or in addition to, being directed (601) by robot controller(s) (509). In embodiments for which the directing (601), opening (603), and/or closing (605) step(s) is/are implemented and/or otherwise performed in system (501) by software (606), robot controller(s) (109) execute computer-executable instructions stored in directing, opening, and/or closing module(s) (608), respectively. These alternating opening (603) and closing (605) movements of barrier device(s) (503) respectively facilitate enabling and restricting access to the item(s) (2) positioned on respective storage locations (504) in the customer (6)-inaccessible storage (10). In the closed position, barrier device(s) (503) provide for safely storing item(s) (2) in manner that prevents, or at least decreases an occurrence probability of, item(s) (2) falling from storage (10) onto floor (137) or other areas in retail store environment (4), which would present an operationally undesirable and potentially hazardous and unsafe scenario, including for customers (6) and for other equipment (e.g., gantry robot(s) (14)). In the open position, barrier device(s) (503) provide for transfer of item(s) (2) to and from the customer (6)-inaccessible storage (10) to the customer (6)-accessible POS locations (8) and/or elsewhere in retail store environment (4).

In a use case, system (501) is utilized by user(s) (511) in conjunction with system (1) and/or system (101), as shown and described above. Gantry robot (14) operations in retail environment (4) may thus proceed to transfer item(s) to and between storage (10) and POS locations (8) during such times when barrier device(s) (503) otherwise restricting access to respective item(s) (2) to be transferred by gantry robot(s) (14) are open, and then those barrier device(s) (503) may be closed after such gantry robot (14) operations are complete. Likewise, barrier robot(s) (113) may be dispatched to floor (137) areas where retail store work operations are being done that require open barrier device(s) (503), thereby increasing the safety of such operations in those areas.

In an example, barrier controller(s) (509) provide control signals to barrier actuator(s) (505) to alternately open (603) and close (605) the barrier device(s) (503). Memory device(s) (602) may store (e.g., as an indexed list, lookup table, and/or other suitable data structures) locations of barrier devices (503) such that robot controller(s) (509) can quickly and accurately address the barrier actuators (505) for transmitting these control signals for the directing (601) operations. User(s) (511) may update barrier device (503) locations in memory (602) as needed, such as when barrier device(s) (503) are added, removed, or replaced from time to time.

In an example, the one or more barrier sensors (507) facilitate the barrier controller (509) obtaining (607) data representative of a position on the barrier device(s) (503) relative to a fixed position of the storage location (504) and/or a potentially dynamic position of the item(s) (2). In an example, the barrier sensor(s) (507) include barrier actuator (505) motor encoder(s) (420), torque sensor(s) (425), range finding and/or other light or electromagnetic wave property-based sensor(s) (430), motion sensor(s) (36), computer vision device(s) (26), and 3D scanner(s) (40) for acquiring and transmitting barrier device (503) positional data and other useful operational status data to the barrier controller(s) (509). In embodiments for which the obtaining (607) step is implemented and/or otherwise performed in system (501) by software (606), robot controller(s) (109) execute computer-executable instructions stored in and obtaining module (608).

In the example, barrier controller(s) (509) direct (601) the autonomous movements of the barrier device(s) (503) to alternately open (603) and close (605) in response to the barrier device (503) positional data obtained (607) from the one or more sensors (507). In the example, barrier controller(s) (509) direct (201) the autonomous movements of barrier device(s) (503) based upon a determination (619) of the position of the barrier device(s) (503). Barrier controller(s) (509) obtain (607) the barrier device (503) positional data from the barrier sensor(s) (507) before, near the time of, substantially simultaneous with, and/or some time after determining (621) a barrier device (503) actuation event. In an example, the determination (621) of the barrier device (503) actuation event is based on data obtained (607) from the barrier sensor(s) (507) (detecting a presence of gantry robot(s) (14) proximal barrier device(s) (503)) and/or signals received from user(s) (511) of system (501) (to initiate opening (603) or closing (605) barrier device(s) (503)). In an example, determining (621) the barrier device (503) actuation event includes barrier controller(s) (509) determining (623) a timing of the actuation event (e.g., to corresponding with an immediate or future time at which gantry (14) and/or barrier (113) robot(s) will be operating according to the embodiments shown and described above with reference to system (1) and/or system (101), respectively). In embodiments for which the determining step(s) (621 and/or 623) is/are implemented and/or otherwise performed in system (501) by software (606), robot controller(s) (109) execute computer-executable instructions stored in position determining and/or timing determining module(s) (608), respectively.

Upon determining (621) the barrier device (503) actuation event, barrier controller(s) (509) address (625) the respective barrier device(s) (503) in the retail store environment (4) for the barrier device (503) actuation event. Barrier controller(s) (509) determine (619) the position (e.g., open vs. closed) of the addressed (625) barrier device(s) (503). If, using logic branch (615), barrier controller(s) (509) determine (619) that an addressed (625) barrier device (503) to be opened (603) is in the closed position, then logic branch (615) directs barrier controller(s) (509) to transmit (609) an open (603) barrier device (503) control signal (611) to the barrier actuator(s) (505) for the respectively addressed (625) barrier device (503). Otherwise, logic branch (615) barrier controller(s) (509) back to the obtaining (607) step. Alternatively, if the barrier controller(s) (509), using logic branch (617), determine (619) that the addressed (625) barrier device (503) to be closed (605) is open, then logic branch (617) directs barrier controller(s) (509) to transmit (609) a close (605) barrier device (503) control signal (613) to the barrier actuator(s) (505) for the respectively addressed (525) barrier device (503). Otherwise, logic branch (617) directs barrier controller(s) (509) back to the obtaining (607) step in system (501). In embodiments for which the addressing (625) step is implemented and/or otherwise performed in system (501) by software (606), robot controller(s) (109) execute computer-executable instructions stored in an addressing module (608). In this manner, barrier controller(s) (509) continually monitor the position(s) of barrier device(s) (503) to ensure the prompt and accurate response to determinations (621) of barrier device (503) actuation events while maintaining safe and efficient work operations and customer (6) experiences in retail store environment (4).

In an embodiment, the one or more sensors (507) facilitate the barrier controller(s) (509) obtaining (607) data representative of a presence of an actual or potential obstruction (69) to the autonomous movements of the barrier device (503) along the full extent of its open-to-closed position movement path (99), as shown in FIGS. 13A-13D. In an example, the barrier controller(s) (509) further facilitate determining (627) the presence of the obstruction (69) to the open-to-closed position movement path (99) based on the data obtained (607) from the one or more sensors (507). In an example, the barrier controller(s) (509) direct (601) the autonomous movements of the barrier device(s) (503) to push (639) the obstruction (69) out of the open-to-closed position movement path (99) in response to determining (627) the presence of the obstruction (69) to the open-to-closed position movement path (99).

In an example, barrier controller(s) (509) direct (601) the autonomous movements of the barrier robot(s) (113) to push (639) the obstruction (69) out of the open-to-closed position movement path (99) upon determining (627), using logic branch (629), the presence of the obstruction (69) to the open-to-closed position movement path (99). Otherwise, upon barrier controller(s) (509) determining (627) that no obstruction (69) to the open-to-closed position movement path (99) is present, logic branch (629) operates in system (501) to return the barrier controller(s) (509) back to the determining (627) step in system (501). In embodiments for which the determining (627) and/or pushing (639) step(s) is/are implemented and/or otherwise performed in system (501) by software (606), barrier controller(s) (509) execute computer-executable instructions stored in obstruction determining and/or pushing module(s) (608), respectively. In this manner, barrier controller(s) (509) continually monitor the open-to-closed position movement path (99) of barrier device(s) (503), and/or regions proximal thereto for presence of actual or potential obstructions (69) which may impede or otherwise undesirably impact movements of barrier device(s) (503), and takes responsive action on an as needed basis to ensure continuous, safe, and efficient barrier device (503) and retail work operations in the retail store environment (4).

In an example, the one or more sensors (507) are positioned in view of the drive path (141) and/or space (123) for sensing the presence of obstruction(s) (69) to the open-to-closed position movement path (99). In another example, the one or more sensors (507) are positioned in and/or on, and/or proximal to, storage locations (504) of the customer (6)-inaccessible storage (10) for sensing the presence of obstruction(s) (69) to the open-to-closed position movement path (99). In yet another example, the one or more sensors (507) are positioned on/or in the item(s) (2) for sensing the presence of obstruction(s) (69) to the open-to-closed position movement path (99). In these examples, the barrier controller(s) (509) further facilitate determining (629) the presence of obstruction(s) (69) based on the data obtained (607) from the motor encoder(s) (420), torque sensor(s) (425), range finding and/or other light or electromagnetic wave property-based sensor(s) (430), motion sensor(s) (36), computer vision device(s) (26), and/or 3D scanner(s) (40).

In a use case, the obstruction (69) includes a portion of the item (2) extending past a boundary (435) of storage location (504) to overhang floor (137), as detected by sensor (507). In an example, user(s) (511) specify and store in memory (602) a maximum allowable overhang distance value by which items (2) may extend past the storage location (504) boundary (435). In the example, barrier controller(s) (509) and/or sensor(s) (507) read this value for use in the determining (627) step and logic branch (629) operation.

FIGS. 13A and 13C, and FIGS. 13B and 13D, respectively illustrate side and frontal views of a storage location (504) unit of the customer (6)-inaccessible storage (10). In the views of FIGS. 13A and 13B, sensor(s) (507) have not detected, and barrier controller(s) (509) have not determined (627), the presence of obstruction (69) to the open (503a)-to-closed (503b) position movement path (99) since item (2) does not extend past the storage location (504) boundary (435). By contrast, in the views of FIGS. 13C and 13D, sensor(s) (507) have detected, and barrier controller(s) (509) have determined (627), the presence of obstruction (69) to the open-to-closed position movement path (99) since item (2) does extend past the storage location (504) boundary (435). In the latter case, barrier device (503) is impeded by obstruction (69) from moving from the open position (503a) to its fully closed position (503b) and therefore assumes, without corrective action being implemented, only a partially closed (e.g., intermediate) position (503c).

In an example, the barrier controller(s) (509) further facilitate determining (631) a capability of the obstruction (69) to be moved (e.g., pushed (639) back fully onto or into the storage location (504) and out of the open-to-closed position movement path (99) by the barrier device (503) based on the data representative of the presence of the obstruction (69). In the example, the process of barrier controller(s) (509) determining (631) the capability of the obstruction (69) to be moved out of the open-to-closed position movement path (99) by the barrier device (503) utilizes logic branch (633). If the obstruction (69) is determined (631) by barrier controller(s) (509) to be so movable by barrier device (503), barrier controller(s) (509) direct (601) the autonomous movements of the barrier device(s) (503) to push (639) the obstruction (69) back fully onto or into storage location (504) and out of the open-to-closed position movement path (99).

Otherwise, upon barrier controller(s) (509) determining (627) that obstruction (69) cannot be so moved out of the open-to-closed position movement path (99) by barrier device (503), the barrier controller(s) (509) further facilitate providing (635) an indication (e.g., lights, sounds, and/or messages) to user(s) (511) of the system (501) of a need to manually transfer (637) the obstruction (69) out of the open-to-closed position movement path (99). In this manner, barrier controller(s) (509) implement responsive actions and/or provide notifications to user(s) (511) regarding obstructions (69) to the open-to-closed position movement path (99) and/or regions proximal thereto to ensure continuous, safe, and efficient barrier device(s) (503) and retail work operations in the retail store environment (4).

In a use case, the determination (631) of whether or not obstruction (69) is movable (e.g., pushable) by barrier device (503) is made based upon a result of one or more obstruction (69) push attempt(s) (641) by barrier device (503). In this case, barrier controller(s) (509) transmit (609) push attempt control signal(s) (641) to increase the electric power flow to the actuator(s) (505), including in an iteratively stepped fashion and/or for a predetermined number of push attempts, and up to a maximum applied electric power value, each of which may be specified by user(s) (511) and/or the system (501) manufacturer, and which may be stored in memory (602) for this purpose. Push (639) success for the one or more push attempts in this example is adjudged by robot controller(s) (509) using logic branch (643) and based on obtained (607) sensor (507) data. If the push attempt are successful, logic branch (643) operates to return system (501) to the obtaining (607). Otherwise, upon determining (631) that obstruction (69) is not movable to a non-overhanging or otherwise out of compliance position on or in storage location (504), the barrier controller(s) (509) further facilitate providing (635) the aforementioned indication to user(s) (511) of the need to manually transfer (637) the obstruction (69) out of the open-to-closed position movement path (99).

In another use case, either instead of, or in addition to, providing (635) the indication to system (501) user(s) (511), barrier controller(s) (509) transmit a signal to one or more controller(s) (e.g., robot controller (18) of system (1)) to call up gantry robot(s) (14) to move the determined (621) obstruction (69) out of the open-to-closed position movement path (99). Similarly, either instead of, or in addition to, providing (635) the indication to system (501) user(s) (511), barrier controller(s) (509) transmit a signal to one or more controller(s) (e.g., robot controller (109) of system (101)) to call up barrier robot(s) (113) to restrict access to a floor (137) proximal to a location of the determined (621) obstruction (69).

The robotic restocking and safety systems for automated retail store environments disclosed herein provide users a number of beneficial technical effects and realize various advantages as compared to known robotic restocking and operational safety systems and methods. Such benefits include, without limitation, being more efficient in use of storage space, physical infrastructure, and computing resources, network bandwidth, and memory storage capacity, providing less expensive and more user friendly installation, operation, and maintenance, consuming less power, being safer and less intrusive to users, shoppers, and employees in retail store and other use environments, allowing use with a number of different items, packaging configurations, delivery modalities, and POS configurations, being interoperable with various extant store equipment, and having the ability to utilize a number of data communication protocols.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof

We claim:

1. A system for securing items in a retail store environment having customer-accessible point-of-sale (POS) locations for the items and customer-inaccessible storage including a storage location for storing one or more of the items, the system comprising:
    a barrier device operably coupled to at least a portion of the storage location for alternately enabling and restricting access to the storage location;
    a barrier actuator operably coupled to: the barrier device, and the at least a portion of the storage location;
    a barrier controller in communication with the barrier actuator for directing autonomous movements of the barrier device to facilitate alternately opening and closing the barrier device;
    one or more sensors in communication with the barrier controller,
wherein alternately opening and closing the barrier device facilitates alternately enabling and restricting the access to the storage location; and
    further comprising a mounting platform, and a gantry robot operably coupled to the mounting platform; wherein the barrier controller is further in communication with the gantry robot for directing autonomous movements of the gantry robot within the storage location, the gantry robot configured to transfer items from within the storage location to the customer-accessible POS locations;
    wherein the barrier controller is further configured to direct the gantry robot to alternately open and close the barrier device.

2. The system of claim 1, wherein alternately opening and closing the barrier device facilitates alternately enabling and restricting access to the storage location.

3. The system of claim 1, wherein the customer-accessible point-of-sale (POS) locations for the items and customer-inaccessible storage location are one or both of vertically and horizontally separate.

4. The system of claim 1, wherein the one or more sensors include one or more of a weight sensor, a computer vision device, a motion sensor, a thermal sensor, or a 3-D scanner.

5. The system of claim 1, wherein the customer-inaccessible storage location comprises one or more of shelves, bins, cages, hangers, drawers, or compartments.

6. The system of claim 1, wherein the gantry robot further comprises one or more sensors obtaining data representative of a presence of an actual or potential obstruction to autonomous movements of the gantry robot within the storage location, and wherein the robot controller further facilitates determining the presence of the obstruction within the storage location based on the data obtained from the one or more sensors.

7. The system of claim 6, wherein the obstruction is a moving object or a stationary object.

8. The system of claim 1, wherein the barrier controller is configured to direct the gantry robot to remove the obstruction.

9. The system of claim 8, wherein the barrier controller, when the gantry robot is unable to remove the obstruction, is configured to provide an indication of the need to manually remove the obstruction.

10. A system for securing items in a retail store environment having customer-accessible point-of-sale (POS) locations for the items and customer-inaccessible storage including a storage location for storing one or more of the items, the system comprising:
    a barrier device operably coupled to at least a portion of the storage location for alternately enabling and restricting access to the storage location;
    a barrier actuator operably coupled to: the barrier device, and the at least a portion of the storage location;
    a barrier controller in communication with the barrier actuator for directing autonomous movements of the barrier device to facilitate alternately opening and closing the barrier device;
    one or more sensors in communication with the barrier controller, wherein alternately opening and closing the barrier device facilitates alternately enabling and restricting the access to the storage location;
    a mounting platform, and a gantry robot operably coupled to the mounting platform; wherein the barrier controller is further in communication with the gantry robot for directing autonomous movements of the gantry robot within the storage location, the gantry robot configured to transfer items from within the storage location to the customer-accessible POS locations;
    wherein the barrier controller is further configured to direct the gantry robot to alternately open and close the barrier device;
    a mobile barrier robot positioned on a floor of the retail store environment having the customer-accessible point-of-sale locations; and
    a robot controller in communication with the barrier robot configured to direct autonomous movements of the barrier robot to facilitate positioning the barrier robot on the floor where retail work operations are being conducted to define a customer-restricted zone so as to restrict customer access to the customer-restricted zone when retail work operations are being conducted therein while permitting customer access to a customer-accessible space where retail work operations are not being conducted to provide customer safety and comfort in the retail store environment, wherein the retail work operations include robotic restocking of inventory in the customer-accessible POS locations via the gantry robot.

11. The system of claim 10 wherein the barrier robot includes a companion robot operably coupled to the barrier robot; and
   wherein the barrier controller directs the autonomous movements of the barrier robot and the companion robot proximal the space as a paired robot unit.

12. The system of claim 11, wherein in response to positioning the paired robot unit proximal the space the robot controller directs the autonomous movements of at least one of the barrier robot and the companion robot to separate from one another on the floor, wherein the as-separated barrier and companion robots together define the customer-restricted zone restricting customer access to the space during the retail work operations therein.

13. The system of claim 10, wherein the barrier robot includes a deployable retractable barrier operably coupled to the barrier robot.

14. The system of claim 13, wherein:
   the robot controller directs the autonomous movements of the barrier robot to:
      deploy the deployable retractable barrier in response to positioning the barrier robot proximal the space before or during the retail work operations therein; and
      retract the deployable retractable barrier in response to determining that the retail work operations in the space are completed or suspended; and
   wherein the barrier robot and the deployable retractable barrier, when deployed, together define the customer-restricted zone restricting customer access to the space before or during the retail work operations therein.

* * * * *